US012581350B2

(12) United States Patent
Jung et al.

(10) Patent No.: US 12,581,350 B2
(45) Date of Patent: Mar. 17, 2026

(54) METHOD AND DEVICE FOR ADJUSTING SPLIT POINT IN WIRELESS COMMUNICATION SYSTEM

(71) Applicant: LG ELECTRONICS INC., Seoul (KR)

(72) Inventors: Ikjoo Jung, Seoul (KR); Sangrim Lee, Seoul (KR); Jayeong Kim, Seoul (KR); Taehyun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 505 days.

(21) Appl. No.: 18/033,876

(22) PCT Filed: Oct. 28, 2021

(86) PCT No.: PCT/KR2021/015323
§ 371 (c)(1),
(2) Date: Nov. 3, 2023

(87) PCT Pub. No.: WO2022/092859
PCT Pub. Date: May 5, 2022

(65) Prior Publication Data
US 2024/0073732 A1     Feb. 29, 2024

(30) Foreign Application Priority Data
Oct. 30, 2020     (KR) ........................ 10-2020-0143584

(51) Int. Cl.
*H04W 28/02*     (2009.01)
*G06N 3/09*     (2023.01)
(Continued)

(52) U.S. Cl.
CPC .......... *H04W 28/0236* (2013.01); *G06N 3/09* (2023.01); *H04L 5/0057* (2013.01); *H04W 72/21* (2023.01)

(58) Field of Classification Search
CPC ........................ H04W 28/0236; H04W 72/21; H04L 5/0057; H06N 3/09
See application file for complete search history.

(56) References Cited

U.S. PATENT DOCUMENTS

| | | |
|---|---|---|
| 2004/0209618 A1 | 10/2004 | Niemela et al. |
| 2011/0116463 A1 | 5/2011 | Ishii et al. |
| | (Continued) | |

FOREIGN PATENT DOCUMENTS

| | | |
|---|---|---|
| KR | 10-2010-0137528 A | 12/2010 |
| KR | 10-2013-0069830 A | 6/2013 |

OTHER PUBLICATIONS

Yongsheng Shi, "Resource Allocation in Cellular Networks with Coexisting Femtocells and Macrocells", VTechWorks, Nov. 18, 2010, 147 pages.

*Primary Examiner* — Brenda H Pham
(74) *Attorney, Agent, or Firm* — BRYAN CAVE LEIGHTON PAISNER LLP

(57) ABSTRACT
In order to provide device and method for adjusting split point in wireless communication system, a method of operating a terminal in a wireless communication system may comprise requesting a base station for uplink channel quality information, receiving, from the base station, the uplink channel quality information, determining a first split point based on the channel quality information, performing first split inference based on the determined first split point and transmitting, to the base station, first split inference result information.

20 Claims, 22 Drawing Sheets

(51) Int. Cl.
      H04L 5/00           (2006.01)
      H04W 72/21      (2023.01)

(56)                References Cited

U.S. PATENT DOCUMENTS

2015/0213370 A1 * 7/2015 Chakrabarti ........... G06Q 50/01
                                             706/52
2022/0005187 A1 * 1/2022 Lyman ................... G16H 40/20

* cited by examiner

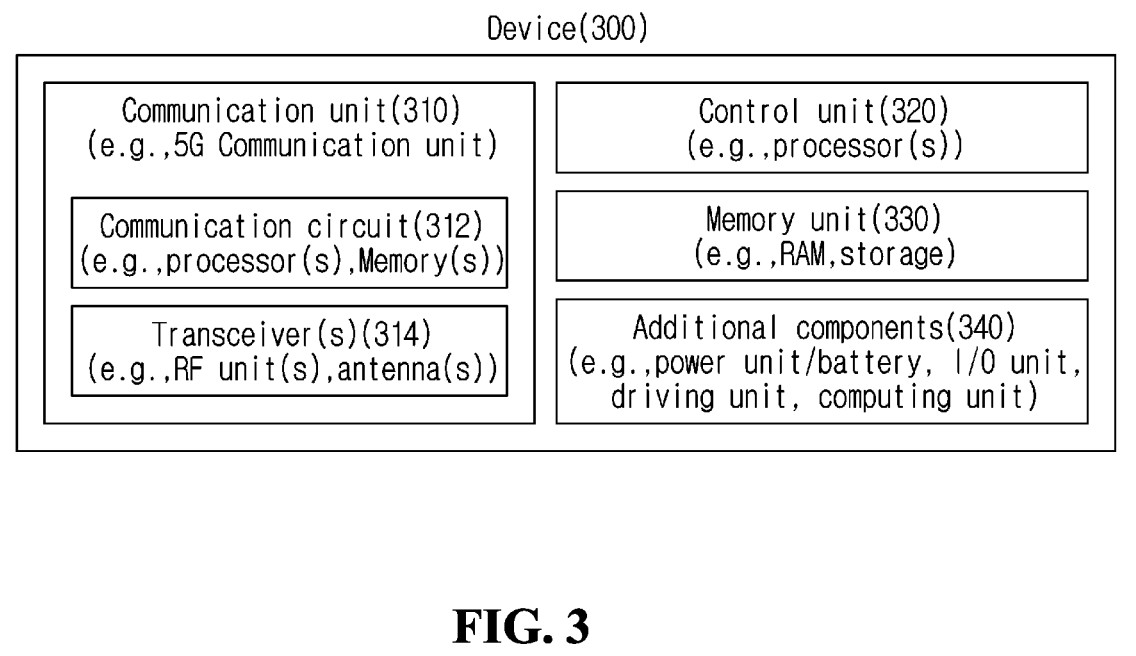

Device(300)

| | |
|---|---|
| Communication unit(310)<br>(e.g.,5G Communication unit) | Control unit(320)<br>(e.g.,processor(s)) |
| Communication circuit(312)<br>(e.g.,processor(s),Memory(s)) | Memory unit(330)<br>(e.g.,RAM,storage) |
| Transceiver(s)(314)<br>(e.g.,RF unit(s),antenna(s)) | Additional components(340)<br>(e.g.,power unit/battery, I/O unit,<br>driving unit, computing unit) |

FIG. 3

METHOD AND DEVICE FOR ADJUSTING SPLIT POINT IN WIRELESS COMMUNICATION SYSTEM

CROSS-REFERENCE TO RELATED APPLICATIONS

This application is the National Stage filing Under 35 U.S.C. 371 of the International Application No. PCT/KR2021/015323, filed on Oct. 28, 2021, which claims benefit of Korean Patent Application No. 10-2020-0143584, filed on Oct. 30, 2020, the entire contents of which are incorporated herein for all purposes by this reference.

TECHNICAL FIELD

The following description relates to a device and method for adjusting a split point in a wireless communication system. More specifically, the present disclosure relates to a device and method for determining a split point and performing additional settings in a system that performs split inference through a split artificial intelligence/machine learning (AI/ML) model.

BACKGROUND

Radio access systems have come into widespread in order to provide various types of communication services such as voice or data. In general, a radio access system is a multiple access system capable of supporting communication with multiple users by sharing available system resources (bandwidth, transmit power, etc.). Examples of the multiple access system include a code division multiple access (CDMA) system, a frequency division multiple access (FDMA) system, a time division multiple access (TDMA) system, a single carrier-frequency division multiple access (SC-FDMA) system, etc.

In particular, as many communication apparatuses require a large communication capacity, an enhanced mobile broadband (eMBB) communication technology has been proposed compared to radio access technology (RAT). In addition, not only massive machine type communications (MTC) for providing various services anytime anywhere by connecting a plurality of apparatuses and things but also communication systems considering services/user equipments (UEs) sensitive to reliability and latency have been proposed. To this end, various technical configurations have been proposed.

SUMMARY

The present disclosure may provide a device and method for adjusting a split point in a wireless communication system.

The present disclosure may provide a device and method for determining a split point in consideration of channel quality in a wireless communication system.

The present disclosure may provide a device and method for additionally setting a split point in a wireless communication system.

The present disclosure may provide a device and method for maximizing inference performance of the device by adjusting a split point in a wireless communication system.

The technical objects to be achieved in the present disclosure are not limited to the above-mentioned technical objects, and other technical objects that are not mentioned may be considered by those skilled in the art through the embodiments described below.

The present disclosure may provide a method of operating a terminal in a wireless communication system. As an example of the present disclosure, the method may include requesting a base station for uplink channel quality information, receiving, from the base station, the uplink channel quality information from the base station, determining a first split point based on the channel quality information, performing first split inference based on the determined first split point and transmitting, to the base station, first split inference result information to the base station.

As an example of the present disclosure, the first split point may indicate a point where the terminal performs the first split inference on data based on an artificial intelligence learning model.

As an example of the present disclosure, the performing the first split inference may include performing the first split inference up to the determined first split point depending on whether inference latency is satisfied.

As an example of the present disclosure, the first split point may be determined by further considering a ratio of computing power occupied by a split artificial intelligence/machine learning (AI/ML) model of the terminal to total computing power of the terminal.

As an example of the present disclosure, the first split point may be determined to be one of movement from a previously set split point in a direction of an input direction, movement in a direction of an output layer or maintaining based on the channel quality information and information on the ratio of computing power occupied by the split AI/ML model of the terminal to total computing power of the terminal.

As an example of the present disclosure, the previously set split point may be any one of an initial split point set by the base station based on quality of service (QoS) or a split point adjusted by the terminal at the initial split point.

As an example of the present disclosure, performing the first split inference may include performing the first split inference based on the inference latency for layers up to the determined first split point satisfying latency of the terminal received from the base station, and transmitting a service performance impossibility indicator to the base station based on the inference latency for layers up to the determined first split point not satisfying the latency of the terminal received from the base station.

As an example of the present disclosure, based on the base service performance impossibility indicator being received by the base station, the base station may reset at least one of the first split point, a layer or an upperbound of the latency of the terminal so that the base station is able to provide a service according to quality of service (QoS) set by a core network.

As an example of the present disclosure, the first split inference result information may include at least one of intermediate data generated as the split inference result or the determined first split point data.

As an example of the present disclosure, the first split inference result information may be transmitted to the base station based only on the request made by the base station in case that the first split point is adjusted up to an output layer.

As an example of the present disclosure, the first split point may be determined to be a location after a hidden layer immediately after the input layer based on being moved in a direction of an input layer.

As an example of the present disclosure, the base station may transmit inference result information of an entire AL/ML model to the core network using the first split inference result information through the remaining split AI/ML model, and the core network may transmit the received result information of the entire AI/ML model to a data network (DN).

As an example of the present disclosure, the base station may perform second split inference from a layer after the determined first split point to an output layer of an AI/ML model, and may set an additional split point between the base station and the core network based on a packet delay budget (PDB) not satisfying from transmission of the result information of the performed second split inference to the core network.

As an example of the present disclosure, a method of operating a base station in a wireless communication system may include receiving, from a terminal, a request for uplink channel quality information, transmitting, to the terminal, the uplink channel quality information, receiving first split inference result information of the terminal performed up to a split point determined based on the channel quality information, generating inference result information of an entire AI/ML model through the remaining split AI/ML model based on the first split inference result information and transmitting the inference result information of the entire AI/ML model to at least one of the terminal or a core network.

As an example of the present disclosure, a terminal in a wireless communication system may include a transceiver and a processor connected to the transceiver. The processor may request a base station for uplink channel quality information, receive, from the base station, the uplink channel quality information, determine a split point based on the channel quality information, perform split inference based on the determined split point, and transmit, to the base station, split inference result information.

As an example of the present disclosure, a base station in a wireless communication system, may include a transceiver; and a processor connected to the transceiver. The processor may receive, from a terminal, a request for uplink channel quality information, transmit, to the terminal, the uplink channel quality information, receive first split inference result information of the terminal, performed up to a split point determined based on the channel quality information, generate inference result information of an entire AI/ML model through the remaining split AI/ML model by performing split inference based on the first split inference result information and transmit, to at least one of the terminal or a core network, the inference result information of the entire AI/ML model.

As an example of the present disclosure, a communication devise may include at least one processor; and at least one computer memory connected to the at least one processor and configured to store instructions instructing operations as executed by the at least one processor. The operations may include requesting a base station for uplink channel quality information, receiving, from the base station, the uplink channel quality information, determining a split point based on the channel quality information, performing split inference based on the determined split point, and transmitting, to the base station, split inference result information.

As an example of the present disclosure, a non-transitory computer-readable medium storing at least one instruction, comprising the at least one instruction executable by a processor. The at least one instruction may instructs a device to request a base station for uplink channel quality information, receive, from the base station, the uplink channel quality information, determine a split point based on the channel quality information, perform split inference based on the determined split point and transmit, to the base station, split inference result information.

The above-described aspects of the present disclosure are merely some of the preferred embodiments of the present disclosure, and various embodiments reflecting the technical features of the present disclosure may be derived and understood by those of ordinary skill in the art based on the following detailed description of the disclosure.

The following effects may be obtained by embodiments based on the present disclosure.

According to the present disclosure, it is possible to adjust a split point based on channel quality in a wireless communication system.

According to the present disclosure, it is possible to reduce latency by adjusting a split point based on channel quality in a wireless communication system.

According to the present disclosure, it is possible to reduce latency by additionally setting a split point in a wireless communication system.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to aid understanding of the present disclosure, and embodiments of the present disclosure may be provided together with a detailed description. However, the technical features of the present disclosure are not limited to a specific drawing, and features disclosed in each drawing may be combined with each other to constitute a new embodiment. Reference numerals in each drawing may mean structural elements.

FIG. 3 is a view showing another example of a wireless device that is applicable to the present disclosure.

DETAILED DESCRIPTION

Figure 1:
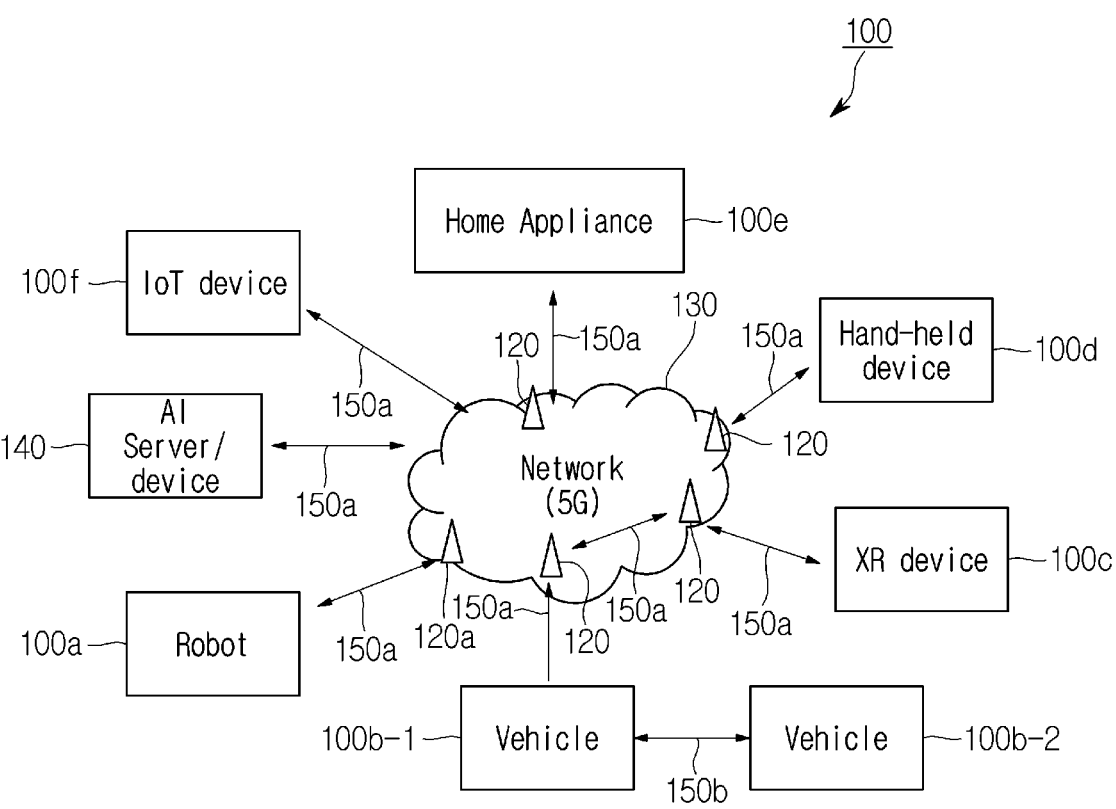
FIG. 1 is a view showing an example of a communication system that is applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a mobile station. A BS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an uplink (UL). Likewise, the mobile station may serve as a receiver and the BS may serve as a transmitter, on a downlink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5th generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as code division multiple access (CDMA), frequency division multiple access (FDMA), time division multiple access (TDMA), orthogonal frequency division multiple access (OFDMA), single carrier frequency division multiple access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.xxx.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 is a view showing an example of a communication system applicable to the present disclosure.

Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100a, vehicles 100b-1 and 100b-2, an extended reality (XR) device 100c, a hand-held device 100d, a home appliance 100e, an Internet of Thing (IoT) device 100f, and an artificial intelligence (AI) device/server 100g. For example, the vehicles may include a vehicle having a wireless communication function, an autonomous vehicle, a vehicle capable of performing vehicle-to-vehicle communication, etc. The vehicles 100b-1 and 100b-2 may include an unmanned aerial vehicle (UAV) (e.g., a drone). The XR device 100c includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100d may include a smartphone, a smart pad, a wearable device (e.g., a smart watch or smart glasses), a computer (e.g., a laptop), etc. The home appliance 100e may include a TV, a refrigerator, a washing machine, etc. The IoT device 100f may include a sensor, a smart meter, etc. For example, the base station 120 and the network 130 may be implemented by a wireless device, and a specific wireless device 120a may operate as a base station/network node for another wireless device.

Communication System Applicable to the Present Disclosure

Figure 2:
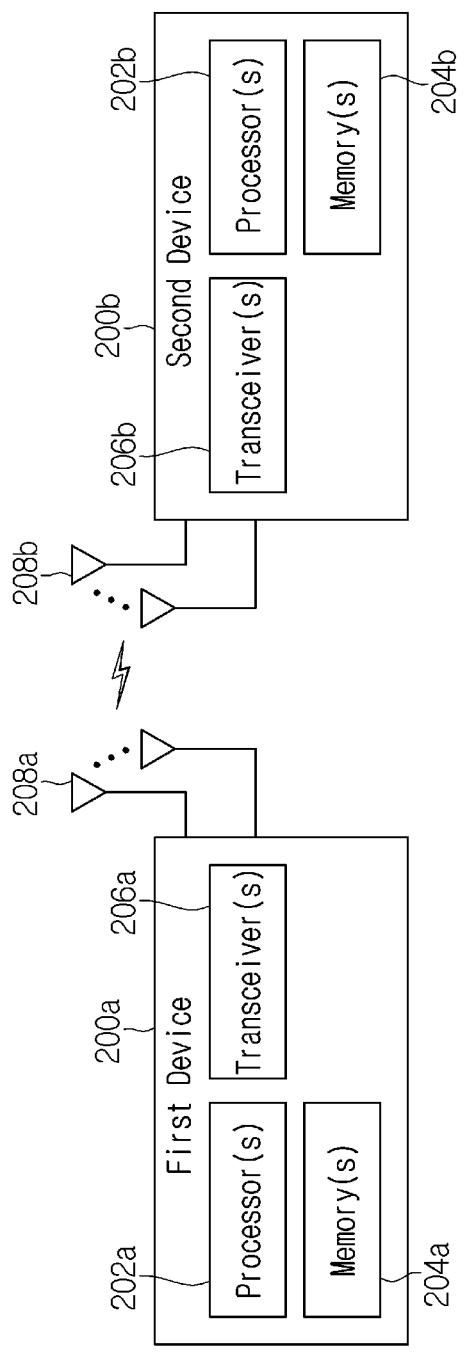
FIG. 2 is a view showing an example of a wireless device that is applicable to the present disclosure.

FIG. 2 is a view showing an example of a wireless device applicable to the present disclosure.

Referring to FIG. 2, a first wireless device 200a and a second wireless device 200b may transmit and receive radio signals through various radio access technologies (e.g., LTE or NR). Here, {the first wireless device 200a, the second wireless device 200b} may correspond to {the wireless device 100x, the base station 120} and/or {the wireless device 100x, the wireless device 100x} of FIG. 1.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202a may process information in the memory 204a to generate first information/signal and then transmit a radio signal including the first information/signal through the transceiver 206a. In addition, the processor 202a may receive a radio signal including second information/signal through the transceiver 206a and then store information obtained from signal processing of the second information/signal in the memory 204a. The memory 204a may be coupled with the processor 202a, and store a variety of information related to operation of the processor 202a. For example, the memory 204a may store software code including instructions for performing all or some of the processes controlled by the processor 202a or performing the descriptions, functions, procedures, proposals, methods and/or operational flowcharts disclosed herein. Here, the processor 202a and the memory 204a may be part of a communication modem/circuit/chip designed to implement wireless communication technology (e.g., LTE or NR). The transceiver 206a may be coupled with the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may refer to a communication modem/circuit/chip.

The second wireless device 200b may include one or more processors 202b and one or more memories 204b and may further include one or more transceivers 206b and/or one or more antennas 208b. The processor 202b may be configured to control the memory 204b and/or the transceiver 206b and to implement the descriptions, functions, procedures, proposals, methods and/or operational flowcharts disclosed herein. For example, the processor 202b may process information in the memory 204b to generate third information/signal and then transmit the third information/signal through the transceiver 206b. In addition, the processor 202b may receive a radio signal including fourth information/signal through the transceiver 206b and then store information obtained from signal processing of the fourth information/signal in the memory 204b. The memory 204b may be coupled with the processor 202b to store a variety of information related to operation of the processor 202b. For example, the memory 204b may store software code including instructions for performing all or some of the processes controlled by the processor 202b or performing the descriptions, functions, procedures, proposals, methods and/or operational flowcharts disclosed herein. Herein, the processor 202b and the memory 204b may be part of a communication modem/circuit/chip designed to implement wireless communication technology (e.g., LTE or NR). The transceiver 206b may be coupled with the processor 202b to transmit and/or receive radio signals through one or more antennas 208b. The transceiver 206b may include a transmitter and/or a receiver. The transceiver 206b may be used interchangeably with a radio frequency (RF) unit. In the present disclosure, the wireless device may refer to a communication modem/circuit/chip.

Structure of Wireless Device Applicable to the Present Disclosure

FIG. 3 is a view showing another example of a wireless device applicable to the present disclosure.

Referring to FIG. 3, a wireless device 300 may correspond to the wireless devices 200a and 200b of FIG. 2 and include various elements, components, units/portions and/or modules. For example, the wireless device 300 may include a communication unit 310, a control unit (controller) 320, a memory unit (memory) 330 and additional components 340. The communication unit may include a communication circuit 312 and a transceiver(s) 314. For example, the communication circuit 312 may include one or more processors 202a and 202b and/or one or more memories 204a and 204b of FIG. 2. For example, the transceiver(s) 314 may include one or more transceivers 206a and 206b and/or one or more antennas 208a and 208b of FIG. 2. The control unit 320 may be electrically coupled with the communication unit 310, the memory unit 330 and the additional components 340 to control overall operation of the wireless device. For example, the control unit 320 may control electrical/mechanical operation of the wireless device based on a program/code/instruction/information stored in the memory unit 330. In addition, the control unit 320 may transmit the information stored in the memory unit 330 to the outside (e.g., another communication device) through the wireless/wired interface using the communication unit 310 over a wireless/wired interface or store information received from the outside (e.g., another communication device) through the wireless/wired interface using the communication unit 310 in the memory unit 330.

Hand-Held Device Applicable to the Present Disclosure

Figure 4:
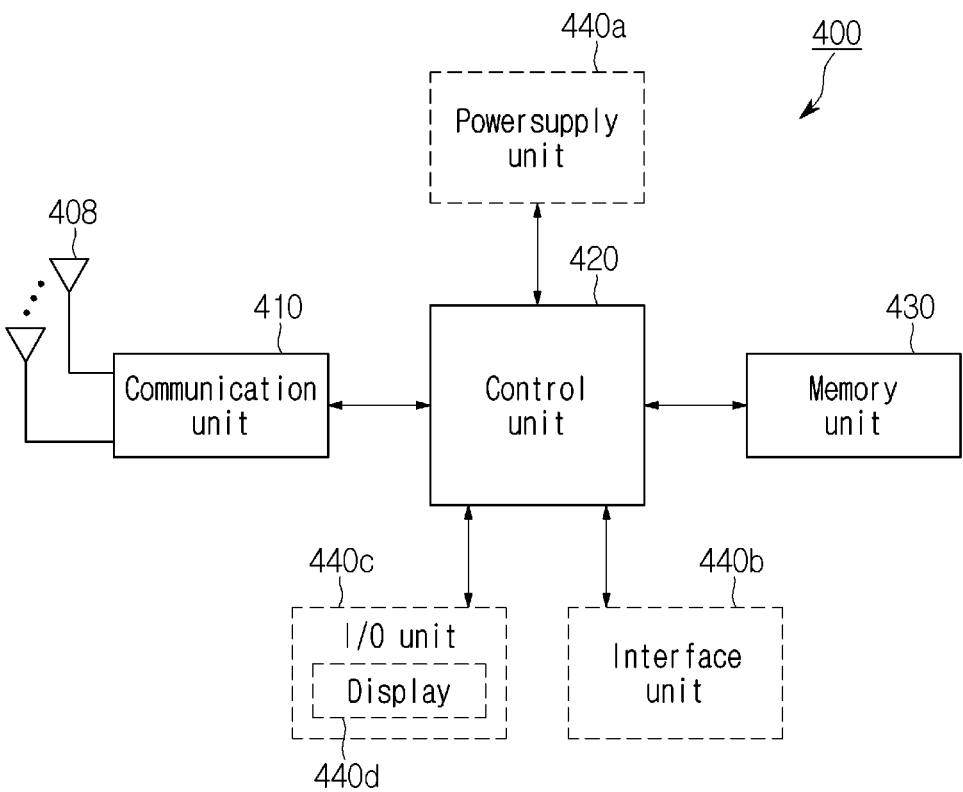
FIG. 4 is a view showing an example of a hand-held device that is applicable to the present disclosure.

FIG. 4 is a view showing an example of a hand-held device applicable to the present disclosure.

FIG. 4 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 4, the hand-held device 400 may include an antenna unit (antenna) 408, a communication unit (transceiver) 410, a control unit (controller) 420, a memory unit (memory) 430, a power supply unit (power supply) 440a, an interface unit (interface) 440b, and an input/output unit 440c. An antenna unit (antenna) 408 may be part of the communication unit 410. The blocks 410 to 430/440a to 440c may correspond to the blocks 310 to 330/340 of FIG. 3, respectively.

The communication unit 410 may transmit and receive signals (e.g., data, control signals, etc.) to and from other wireless devices or base stations. The control unit 420 may control the components of the hand-held device 400 to perform various operations. The control unit 420 may include an application processor (AP). The memory unit 430 may store data/parameters/program/code/instructions necessary to drive the hand-held device 400. In addition, the memory unit 430 may store input/output data/information, etc. The power supply unit 440a may supply power to the hand-held device 400 and include a wired/wireless charging circuit, a battery, etc. The interface unit 440b may support connection between the hand-held device 400 and another external device. The interface unit 440b may include various ports (e.g., an audio input/output port and a video input/output port) for connection with the external device. The input/output unit 440c may receive or output video information/signals, audio information/signals, data and/or user input information. The input/output unit 440c may include a camera, a microphone, a user input unit, a display 440d, a speaker and/or a haptic module.

For example, in case of data communication, the input/output unit 440c may acquire user input information/signal (e.g., touch, text, voice, image or video) from the user and store the user input information/signal in the memory unit 430. The communication unit 410 may convert the information/signal stored in the memory into a radio signal and transmit the converted radio signal to another wireless device directly or transmit the converted radio signal to a base station. In addition, the communication unit 410 may receive a radio signal from another wireless device or the base station and then restore the received radio signal into original information/signal. The restored information/signal may be stored in the memory unit 430 and then output through the input/output unit 440c in various forms (e.g., text, voice, image, video and haptic).

Type of Wireless Device Applicable to the Present Disclosure

Figure 5:
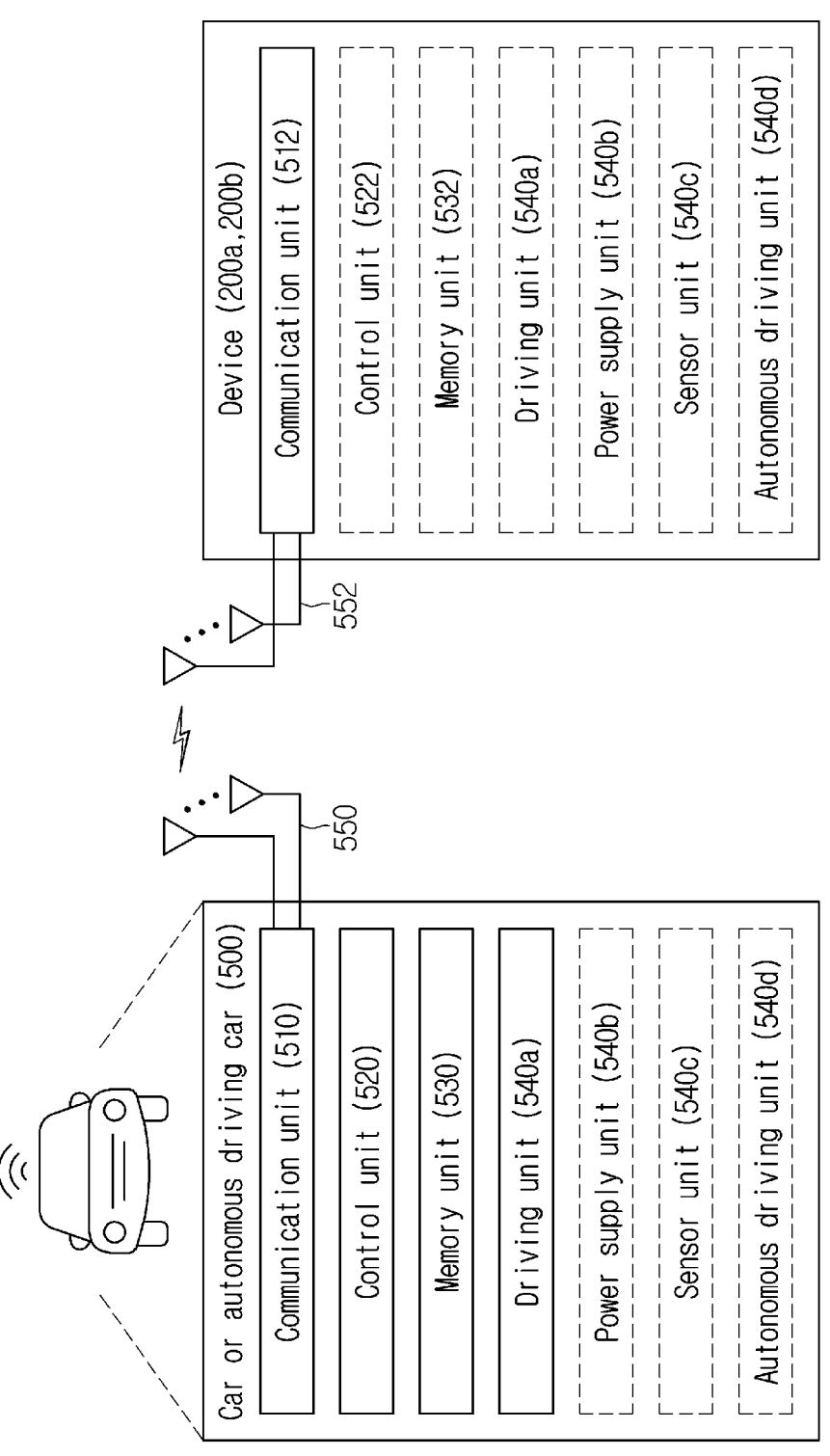
FIG. 5 is a view showing an example of a vehicle or an autonomous vehicle that is applicable to the present disclosure.

FIG. 5 is a view showing an example of a car or an autonomous driving car applicable to the present disclosure.

FIG. 5 shows a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited.

Referring to FIG. 5, the car or autonomous driving car 500 may include an antenna unit (antenna) 508, a communication unit (transceiver) 510, a control unit (controller) 520, a driving unit 540a, a power supply unit (power supply) 540b, a sensor unit 540c, and an autonomous driving unit 540d. The antenna unit 550 may be configured as part of the communication unit 510. The blocks 510/530/540a to 540d correspond to the blocks 410/430/440 of FIG. 4.

The communication unit 510 may transmit and receive signals (e.g., data, control signals, etc.) to and from external devices such as another vehicle, a base station (e.g., a base station, a road side unit, etc.), and a server. The control unit 520 may control the elements of the car or autonomous driving car 500 to perform various operations. The control unit 520 may include an electronic control unit (ECU).

Figure 6:
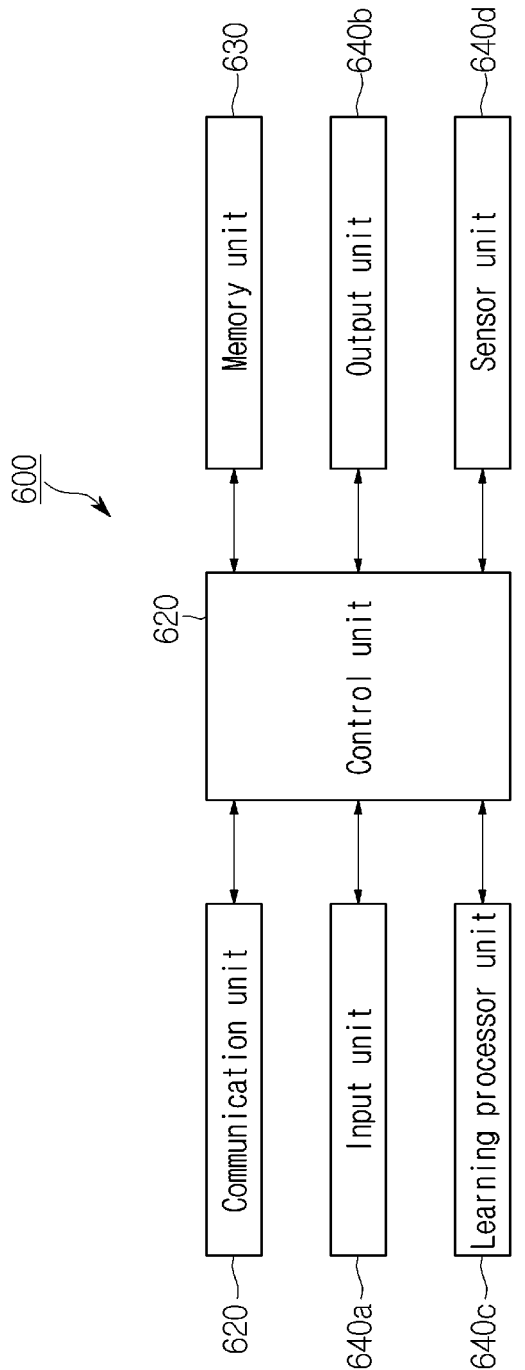
FIG. 6 is a view showing an example of artificial intelligence (AI) that is applicable to the present disclosure.

FIG. 6 is a view showing an example of artificial intelligence (AI) device applicable to the present disclosure. For example, the AI device may be implemented as fixed or movable devices such as a TV, a projector, a smartphone, a PC, a laptop, a digital broadcast terminal, a tablet PC, a wearable device, a set-top box (STB), a radio, a washing machine, a refrigerator, a digital signage, a robot, a vehicle, or the like.

Referring to FIG. 6, the AI device 600 may include a communication unit (transceiver) 610, a control unit (controller) 620, a memory unit (memory) 630, an input/output unit 640a/640b, a leaning processor unit (learning processor) 640c and a sensor unit 640d. The blocks 610 to 630/640a to 640d may correspond to the blocks 310 to 330/340 of FIG. 3, respectively.

The communication unit 610 may transmit and receive wired/wireless signals (e.g., sensor information, user input, learning models, control signals, etc.) to and from external devices such as another AI device (e.g., FIG. 1, 100x, 120 or 140) or the AI server (FIG. 1, 140) using wired/wireless communication technology. To this end, the communication unit 610 may transmit, to an external device, information in the memory unit 630 or transfer a signal received from the external device to the memory unit 630.

The control unit 620 may determine at least one executable operation of the AI device 600 based on information determined or generated using a data analysis algorithm or a machine learning algorithm. In addition, the control unit 620 may control the components of the AI device 600 to perform the determined operation. For example, the control unit 620 may request, search for, receive or utilize the data of the learning processor unit 640c or the memory unit 630, and control the components of the AI device 600 to perform predicted operation or operation, which is determined to be desirable, of at least one executable operation. In addition, the control unit 620 may collect history information including operation of the AI device 600 or user's feedback on the operation and store the history information in the memory unit 630 or the learning processor unit 640c or transmit to the AI server the history information (FIG. 1, 140). The collected history information may be used to update a learning model.

The memory unit 630 may store data supporting various functions of the AI device 600. For example, the memory unit 630 may store data obtained from the input unit 640a, data obtained from the communication unit 610, output data of the learning processor unit 640c, and data obtained from the sensing unit 640. In addition, the memory unit 630 may store control information and/or software code necessary to operate/execute the control unit 620.

The input unit 640a may acquire various types of data from the outside of the AI device 600. For example, the input unit 640a may acquire learning data for model learning, input data, to which the learning model will be applied, etc. The input unit 640a may include a camera, a microphone and/or a user input unit. The output unit 640b may generate video, audio or tactile output. The output unit 640b may include a display, a speaker and/or a haptic module. The sensing unit 640 may obtain at least one of internal information of the AI device 600, the surrounding environment information of the AI device 600 and user information using various sensors. The sensing unit 640 may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar.

The learning processor unit 640c may train a model composed of an artificial neural network using training data. The learning processor unit 640c may perform AI processing along with the learning processor unit of the AI server (FIG. 1, 140). The learning processor unit 640c may process information received from an external device through the communication unit 610 and/or information stored in the memory unit 630. In addition, the output value of the learning processor unit 640c may be transmitted to the external device through the communication unit 610 and/or stored in the memory unit 630.

Core Implementation Technology of 6G System

Artificial Intelligence (AI)

The most important and newly introduced technology for the 6G system is AI. AI was not involved in the 4G system. 5G systems will support partial or very limited AI. However, the 6G system will support AI for full automation. Advances in machine learning will create more intelligent networks for real-time communication in 6G. Introducing AI in communication may simplify and enhance real-time data transmission. AI may use a number of analytics to determine how complex target tasks are performed. In other words, AI may increase efficiency and reduce processing delay.

Time consuming tasks such as handover, network selection, and resource scheduling may be performed instantly by using AI. AI may also play an important role in machine-to-machine, machine-to-human and human-to-machine communication. In addition, AI may be rapid communication in a brain computer interface (BCI). AI-based communication systems may be supported by metamaterials, intelligent structures, intelligent networks, intelligent devices, intelligent cognitive radios, self-sustained wireless networks, and machine learning.

Recently, attempts have been made to integrate AI with wireless communication systems, but application layers, network layers, and in particular, deep learning have been focused on the field of wireless resource management and allocation. However, such research is gradually developing into the MAC layer and the physical layer, and in particular, attempts to combine deep learning with wireless transmission are appearing in the physical layer. AI-based physical layer transmission means applying a signal processing and communication mechanism based on an AI driver rather than a traditional communication framework in fundamental signal processing and communication mechanisms. For example, deep learning-based channel coding and decoding, deep learning-based signal estimation and detection, deep learning-based multiple input multiple output (MIMO) mechanism, and AI-based resource scheduling and allocation may be included.

Machine learning may be used for channel estimation and channel tracking, and may be used for power allocation, interference cancellation, and the like in a downlink (DL) physical layer. Machine learning may also be used for antenna selection, power control, symbol detection, and the like in a MIMO system.

However, the application of DNN for transmission in the physical layer may have the following problems.

Deep learning-based AI algorithms require a lot of training data to optimize training parameters. However, due to limitations in obtaining data in a specific channel environment as training data, a lot of training data is used offline. This is because static training on training data in a specific channel environment may cause a contradiction between diversity and dynamic characteristics of a radio channel.

In addition, current deep learning mainly targets real signals. However, the signals of the physical layer of wireless communication are complex signals. In order to match the characteristics of a wireless communication signal, additional research on a neural network that detects a complex domain signal is required.

Hereinafter, machine learning will be described in greater detail.

Machine learning refers to a series of operations for training a machine to create a machine capable of performing a task which can be performed or is difficult to be performed by a person. Machine learning requires data and a learning model. In machine learning, data learning methods may be largely classified into three types: supervised learning, unsupervised learning, and reinforcement learning.

Neural network learning is to minimize errors in output. Neural network learning is a process of updating the weight of each node in the neural network by repeatedly inputting learning data to a neural network, calculating the output of the neural network for the learning data and the error of the target, and backpropagating the error of the neural network from the output layer of the neural network to the input layer in a direction to reduce the error.

Supervised learning uses learning data labeled with correct answers in the learning data, and unsupervised learning may not have correct answers labeled with the learning data. That is, for example, learning data in the case of supervised learning related to data classification may be data in which each learning data is labeled with a category. Labeled learning data may be input to the neural network, and the output (category) of the neural network and the label of the learning data may be compared, thereby calculating an error. The calculated error is backpropagated in a reverse direction (i.e., from the output layer to the input layer) in the neural network, and the connection weight of each node of each layer of the neural network may be updated according to backpropagation. The amount of change in the connection weight of each updated node may be determined according to a learning rate. The neural network's computation of input data and backpropagation of the error may constitute a learning cycle (epoch). The learning rate may be applied differently according to the number of iterations of the learning cycle of the neural network. For example, in the early stages of learning of the neural network, a high learning rate is used to allow the neural network to quickly achieve a certain level of performance to increase efficiency, and in the late stage of learning, a low learning rate may be used to increase accuracy.

A learning method may vary according to characteristics of data. For example, when the purpose is to accurately predict data transmitted from a transmitter in a communication system at a receiver, it is preferable to perform learning using supervised learning rather than unsupervised learning or reinforcement learning.

The learning model corresponds to the human brain, and although the most basic linear model may be considered, a paradigm of machine learning that uses a neural network structure with high complexity such as artificial neural networks as a learning model is referred to as deep learning.

The neural network cord used in the learning method is largely classified into deep neural networks (DNN), convolutional deep neural networks (CNN), and recurrent Boltzmann machine (RNN), and this learning model may be applied.

Hereinafter, a method of adjusting a split point based on an AI/ML (artificial intelligence/machine learning) model based on the foregoing will be described.

Based on the foregoing, large amounts of data (high-dimensional data collected through biosensors, large images, large videos) may be generated, collected, and processed through AI/ML models. In this case, the device for generating and collecting data may be a cellular Internet of Things (IoT) device.

Figure 7A:
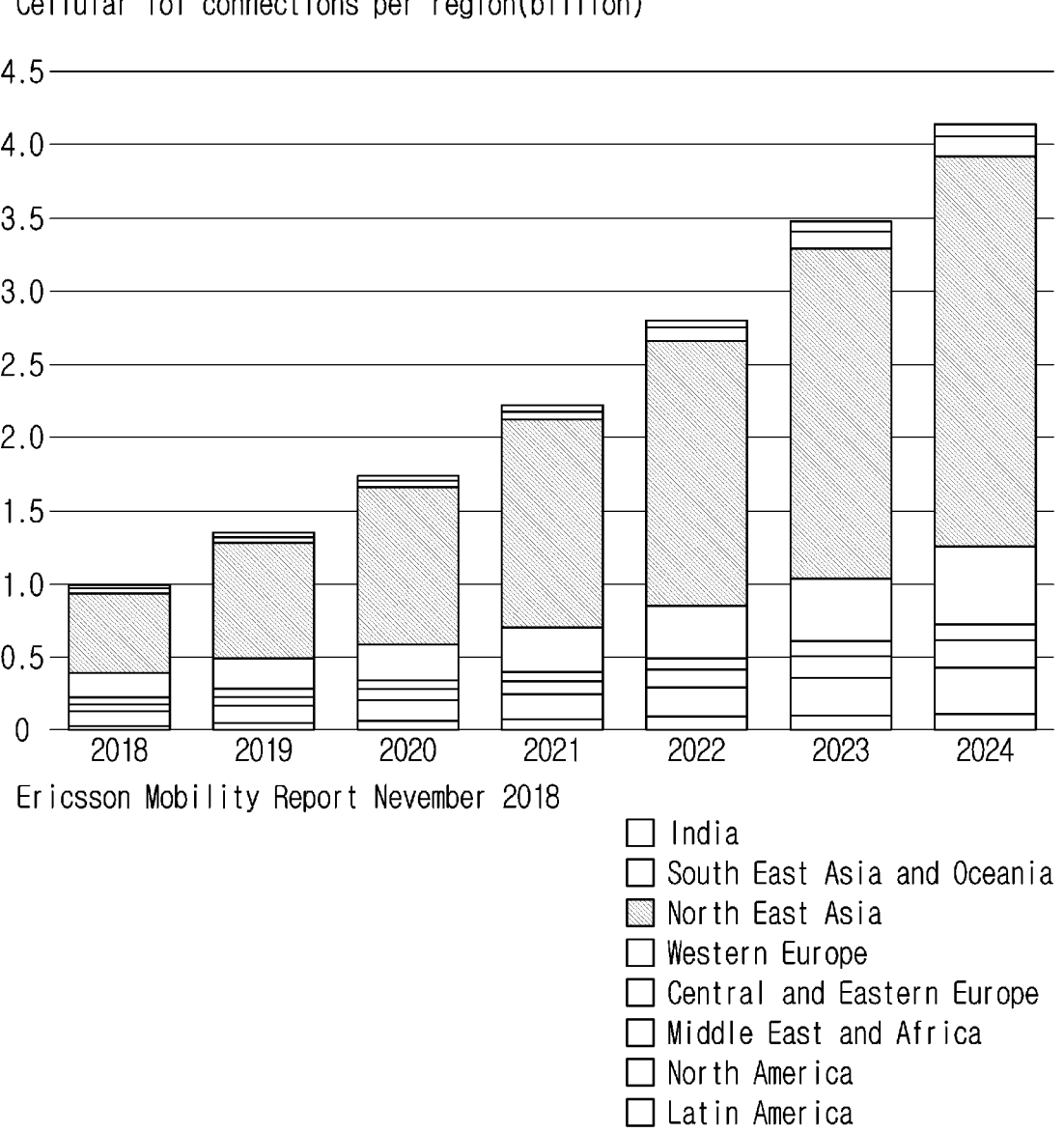
FIG. 7A is a diagram illustrating materials related to data generation and collection according to an embodiment of the present disclosure.
Figure 7B:
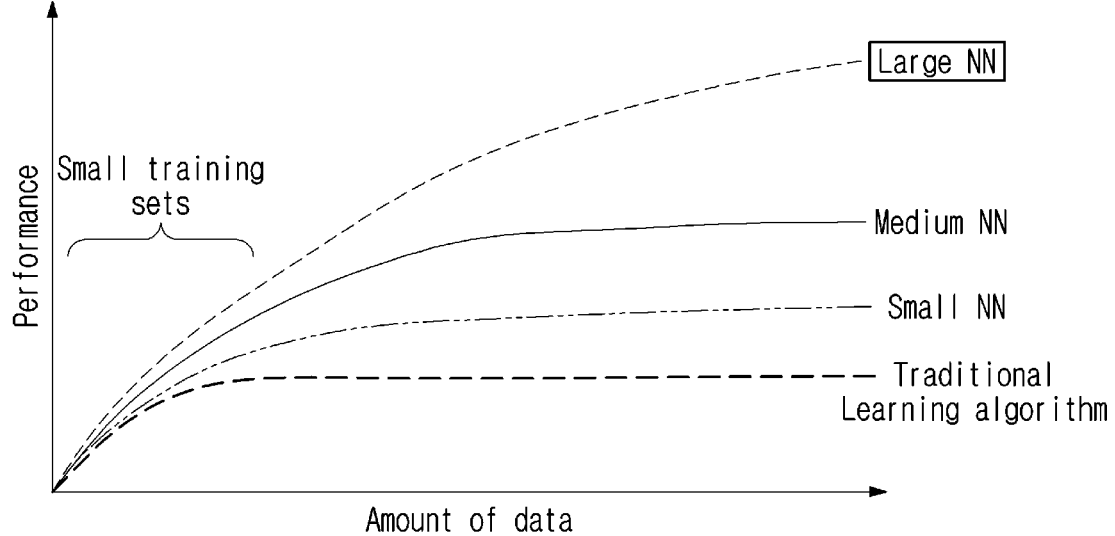
FIG. 7B is a diagram illustrating materials related to data generation and collection according to an embodiment of the present disclosure.

FIG. 7A and FIG. 7B is a diagram illustrating materials related to data generation and collection according to an embodiment of the present disclosure.

Referring to FIG. 7A, it can be seen that the amount of cellular IoT connection for data generation and collection is steadily increasing. Today, due to the increase in the number of Cellular IoT devices, the amount of Cellular IoT connection has increased. This also made it possible to secure large amounts of data of the device. The device may classify and predict large amounts of high-dimensional data through AI/ML models. Performance of AI/ML models for processing large amounts of data is also improving.

Referring to FIG. 7B, the graph shows the amount of data and performance of a large neural network (LNN), a medium neural network (MNN), a small neural network (SNN), and a traditional learning algorithm (TLA). The horizontal axis of the graph represents the amount of data, and the vertical axis represents performance. LNNs, MNNs, SNNs, and TLAs all show a gradual increase in performance in a place where there are small training sets with small amounts of data. However, it can be seen that as the amount of data increases, a point in time when performance improvement slows down is set in the order of TLA, SNN, and MNN, whereas in the case of LNN, performance improves well while using more data compared to other models. Therefore, it can be seen that large-scale AI/ML models that may improve performance to match the amount of data are needed to process huge amounts of data.

The AI/ML model may build a deep and wide model by continuous learning using a large amount of data to improve performance. Accordingly, the size of the model gradually increases, and the model may include up to millions of parameters.

When the size of a model increases to process large-scale data, the following problems occur.

As the amount of data increases, the model may require large computing power to perform training and inference. However, the computing power of each device is limited. If the limit of data which may be processed by the device is exceeded, the device cannot perform training and inference through the AI/ML model. For example, inference may be a process of passing data through a network and outputting a result according to an input. For example, inference may be a process of calculating at least one layer. Also, as an example, training may be a process of comparing an inference result with a correct answer and adjusting variables inside the network so that the inference result approaches or coincides with the correct answer when an inference is performed later.

In addition, when offloading data generated or collected in each device to a server (base station), a latency problem occurs as a large amount of data is transmitted through uplink with limited resources, or a problem of setting excessive uplink bandwidth may occur. Also, due to the transmission of raw data, various types of personal information protection problems may occur.

Therefore, in order to solve the latency problem of the AI/ML device processing large amounts of data and to protect personal information, it may be necessary to build a split AI/ML model for splitting and performing an AI/ML model set between a device and a network.

Figure 8:
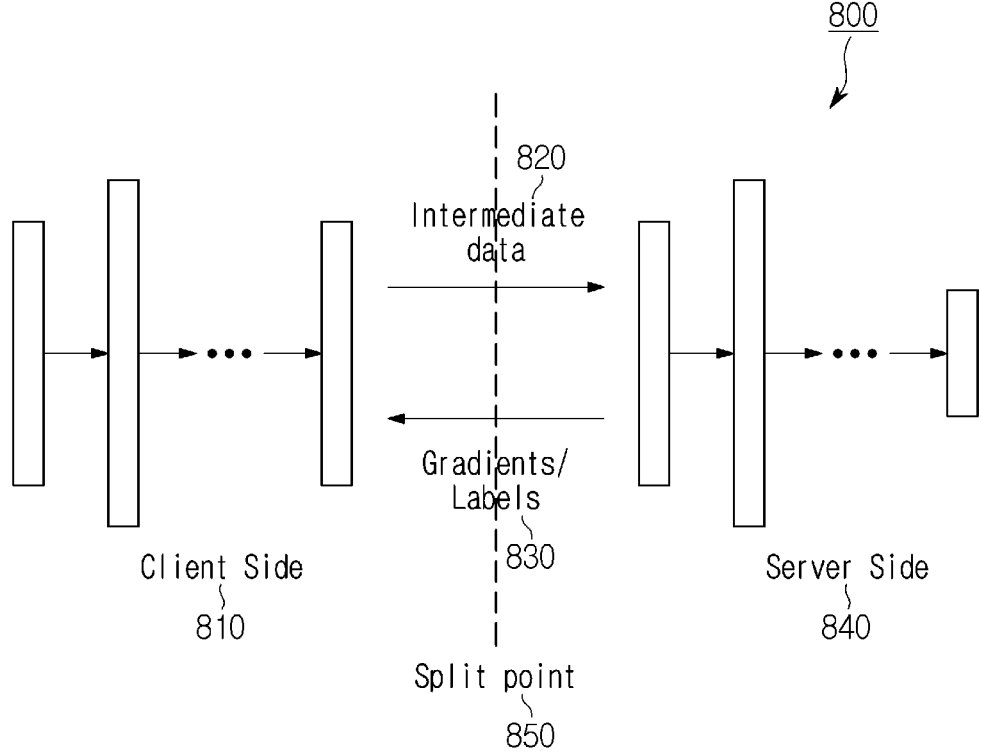
FIG. 8 illustrates an example of a system that performs a split AI/ML model, according to one embodiment of the present disclosure.

FIG. 8 illustrates an example of a system 800 that performs a split AI/ML model, according to one embodiment of the present disclosure.

Referring to FIG. 8, the system 800 may assign a split AI/ML model for performing split inference in units of split layers according to requirements (calculation capability, latency, personal information protection) of services (object recognition, augmented reality) to a device and a server (base station). At this time, the split model 810 assigned to the device may perform data processing by forward propagation up to a split point 850, and deliver intermediate data 820, which is a result (output) performed up to the split point 850, to a split model 840 assigned to the server. That is, the split point 850 is a point at which the inference performance of the AI/ML model is split. For example, when a split AI/ML model is built between a device and a server, the device may perform split inference on layers up to the split point, and the server may perform split inference on layers after the split point. The split model 840 assigned to the server may perform split inference using the intermediate data 820 received from the split model assigned to the device. The split model 840 assigned to the server may deliver a label 830, which is a result of completion of the split inference, to the device.

For example, the device 810 may perform inference by receiving the label 830 from the server. When the device performs learning, it may receive a gradient of a loss function for the intermediate data 820 from the server and perform a back propagation procedure. Split inference may be referred to as split inference, partial inference, or other terms having an equivalent technical meaning, and may not be limited to a specific name. However, for convenience of description, the following description is based on split inference.

As shown in FIG. 8, a split point is required for the device and the server to perform split inference through the split AI/ML model. The split point is a point at which the model performing the inference is split into the device and the server. An initial split point may be set at a point in time when learning of the split model is completed.

A split point, which is a location for splitting an AI/ML model, may be determined through a split engine. The split engine may determine when the split point needs to be changed and adjust the split point, by receiving the size of the intermediate data transmitted from the device to the server through uplink and the amount of calculation required to calculate layers from the device to the split point. The split engine notifies the device and the server of the determination result and the adjustment result, and the device and server perform inference according to the adjusted split point.

Figure 9B:
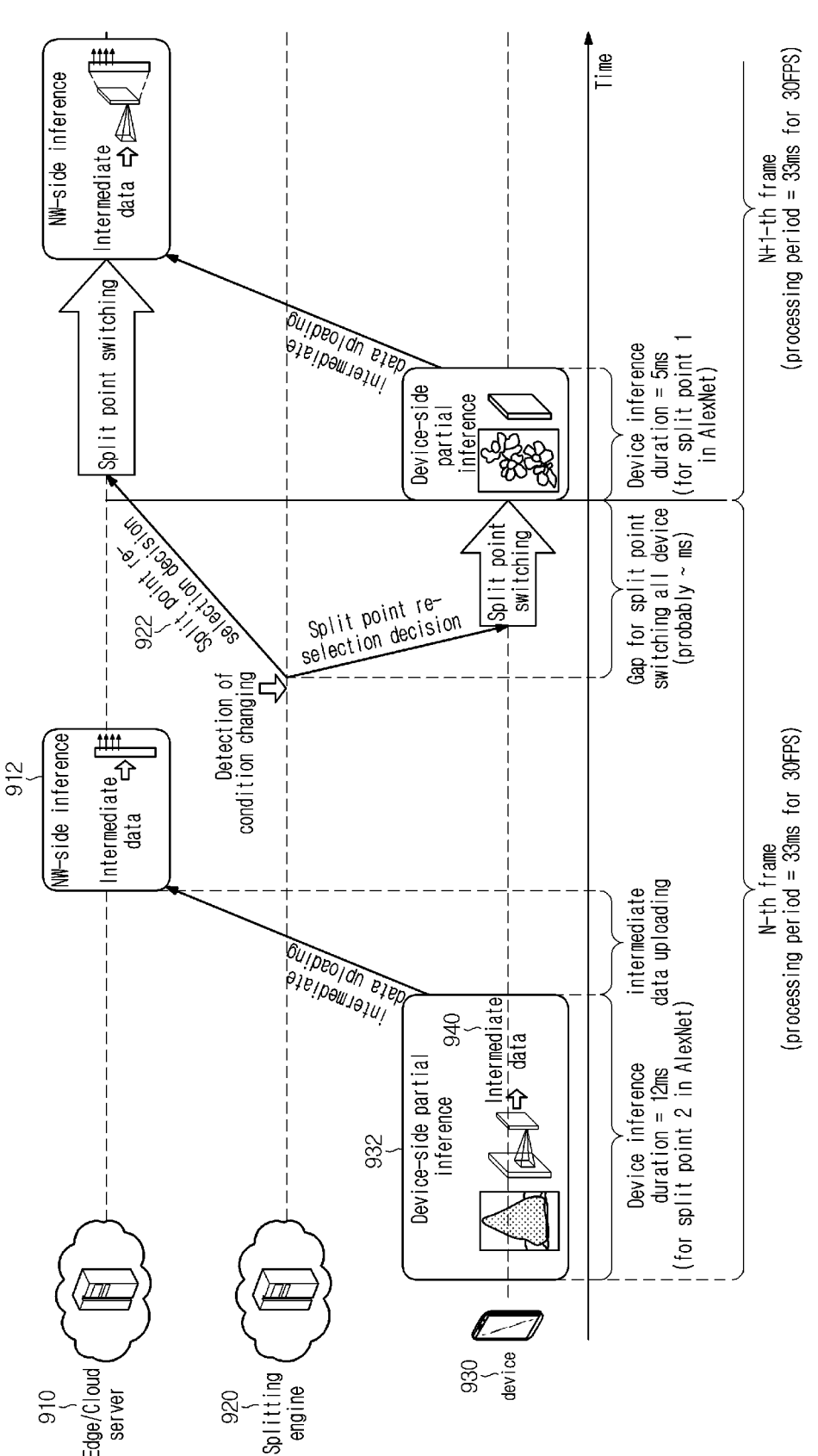
FIG. 9 illustrates an example of operation for split point determination of a split engine according to an embodiment of the present disclosure.

FIG. 9 illustrates an example of operation for split point determination of a split engine according to an embodiment of the present disclosure.

Referring to FIG. 9, a device 930 may generate intermediate data 940 by performing split inference 932 using a split AI/ML model assigned to the device. The device 930 may transmit, to a server 910, the generated intermediate data 932. The server 910 may perform split inference 912 using the split AI/ML model assigned to a network using the received intermediate data 932.

A splitting engine 920 may adjust a split point based on the size of the intermediate data 932 and the amount of calculation required for the device 930 to calculate layers up to the split point. For example, the splitting engine 920 may adjust the split point in a direction of an output layer upon determining that the device 930 is suitable for performing split inference on more layers than before. In addition, the splitting engine 920 may adjust the split point in a direction of an input layer upon determining that the server 910 is suitable for performing split inference on more layers than before.

In operating a service using a split AI/ML model, the device shall perform an operation in consideration of quality of service (QoS) set to operate the service. However, when the split model is implemented through the splitting engine, channel quality at a point in time when the device transmits the intermediate data to the server is not considered. Although channel quality may vary for reasons such as the mobility of the device, the split engine semi-statically adjusts the split point in consideration of only the size of the intermediate data and the amount of calculation required for the device to calculate the layers up to the split point. Therefore, intermediate data transmission and inference performance of the device after split point adjustment may not satisfy QoS. Accordingly, data that does not satisfy QoS may be discarded according to the base station policy, and the device may not be able to obtain desired labels.

In addition, the device simultaneously performs various operations such as data collection/generation for insertion into an input layer, control of related sensors, and OS operation, as well as split AI/ML operations for providing services. Accordingly, the ratio of the computing power occupied by each operation performed by the device to the total computing power of the device may vary from moment to moment. In addition, the computing power of the device may be affected by the influence of the external environment (temperature).

Accordingly, the split point needs to be adjusted in consideration of channel quality and computing power of the device, as well as the size of intermediate data and the amount of calculation required for the device to calculate layers up to the split point.

In addition, a base station performing multiple operations may not satisfy QoS in some cases. In this case, if split inference for layers after the split point cannot be normally performed, inference may be performed using a core network. To this end, a split point between the base station and the core network may be additionally set.

The present disclosure proposes a method and procedure for adjusting a split point in consideration of a channel state between a device and a base station and the computing power of the device in a situation where the device performs inference through a split AI/ML model and additionally setting a split point according to the computing power of the base station in consideration of latency between the base station and a core network.

Figure 10:
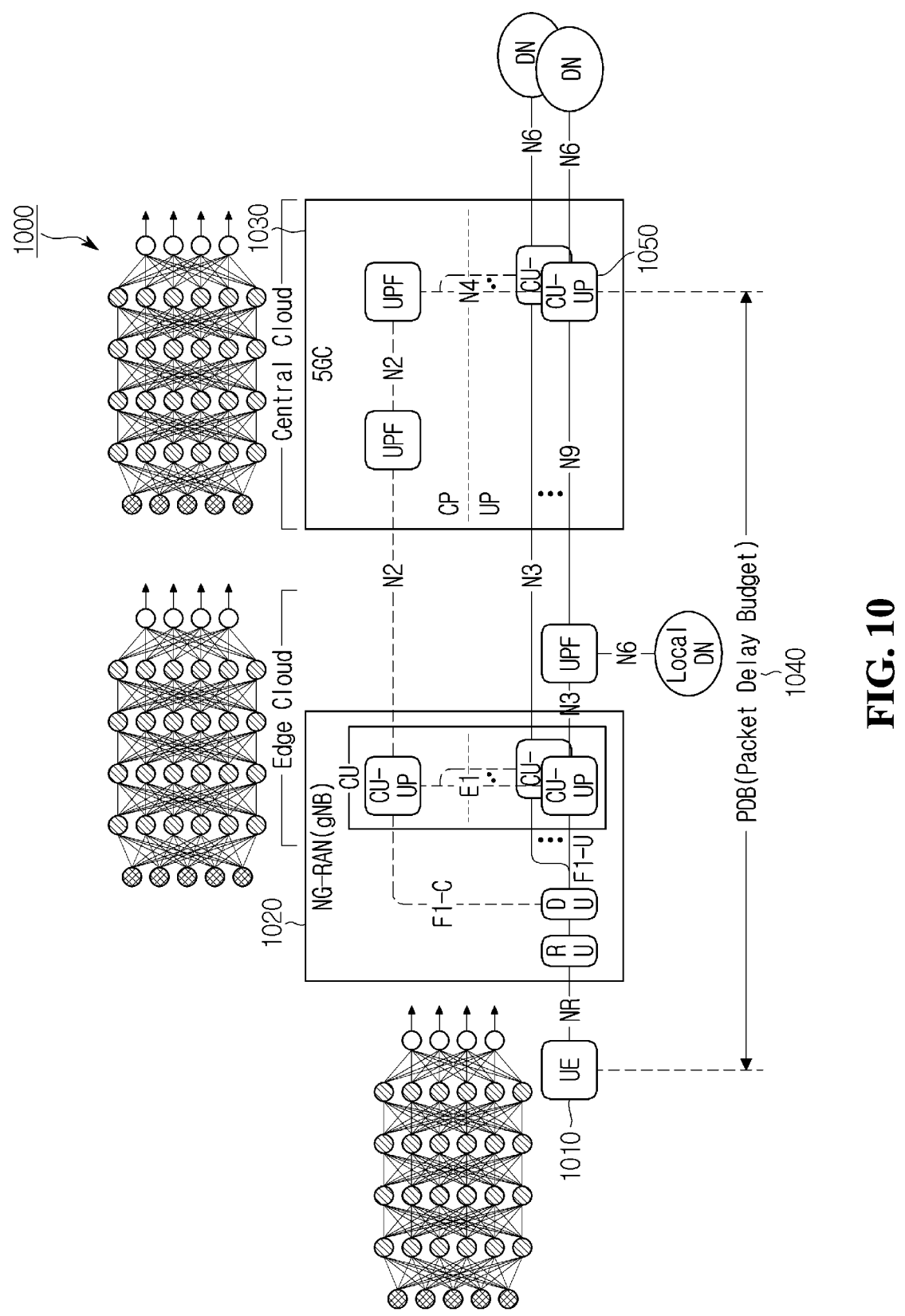
FIG. 10 illustrates an example of a system for performing inference through a split AI/ML model according to an embodiment of the present disclosure.

FIG. 10 illustrates an example of a system 1000 for performing inference through a split AI/ML model according to an embodiment of the present disclosure.

Referring to FIG. 10, split point adjustment may be performed based on a device, a base station and a core network. For example, the system 1000 may include a device 1010, a base station 1020 capable of performing an edge cloud function, and a core network 1030 capable of performing a central cloud function, but may not be limited thereto. For example, an AI/ML model supporting the split AI/ML model is installed in each of the device 1010, the base station 1020, and the core network 1030, and each of the device 1010, the base station 1020, and the core network 1030 may have an entire AI/ML model. Also, as an example, a packet delay budget (PDB) may be an allowable latency value from the device 1010 to a user plane function (UPF) 1050 of the core network 1030, which will be described later.

The present disclosure assumes the following environment in order to adjust a split point when performing inference through a split AI/ML model.

In the direction of the output layer based on the split point of the split AI/ML model, the size of the intermediate data shall be the same or decrease. In addition, in the direction of the input layer based on the split point of the split model, the size of the intermediate data shall be the same or increase. That is, the size of the intermediate data derived from the split AI/ML model shall generally decrease in the direction of the output layer and generally increase in the direction of the input layer.

Figure 11:
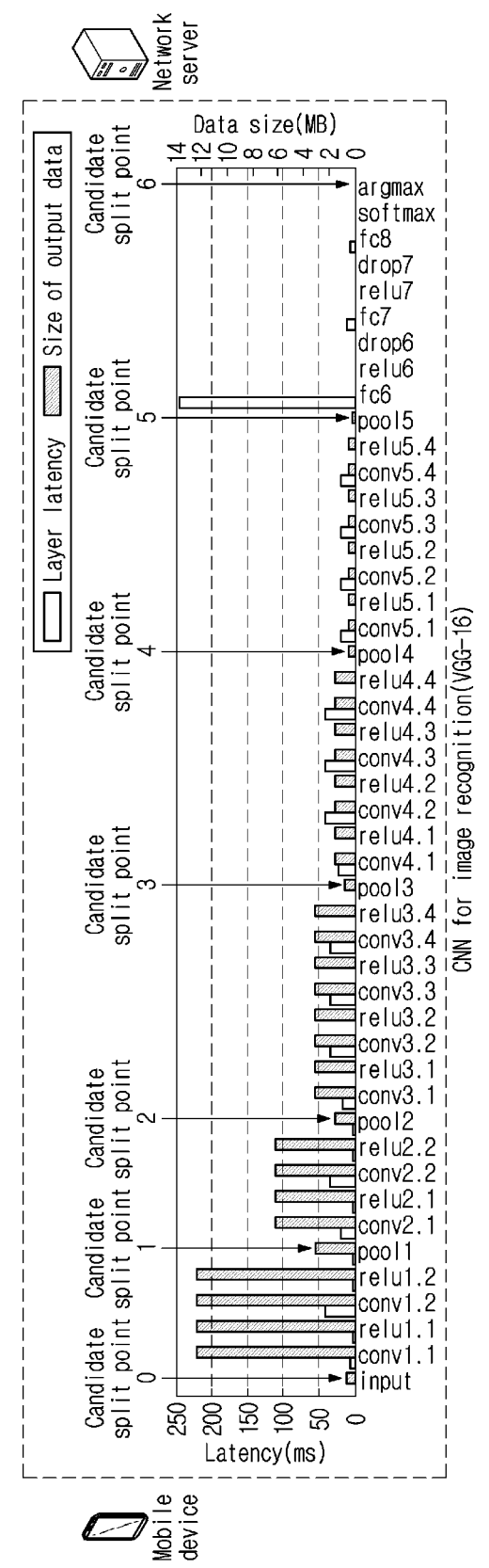
FIG. 11 illustrates an example of a VGG-16 model for implementing a split AI/ML model according to an embodiment of the present disclosure.

FIG. 11 illustrates an example of a VGG-16 model 1100 for implementing a split AI/ML model according to an embodiment of the present disclosure. The model 1100 of FIG. 11 satisfies the above assumption.

Referring to FIG. 11, in the model 1100, based on the candidate split point, the size of intermediate data generally increases in the direction of the input layer, and the size of intermediate data decreases in the direction of the output layer.

In order for the device to adjust the split point, the following initial settings are first required. The core network sets QoS for a service using a split model. The base station sets a split point to provide a corresponding service according to the set QoS. The base station also sets an upperbound of latency of the device. The latency of the device may include latency that occurs when the device performs inference and latency that occurs when the device transmits radio data, and may be expressed as Equation 1 below. In addition, the upperbound of the latency of the device set by the base station may be the same as Equation 2 below, but may not be limited thereto.

$$\text{inference latency}=\text{device inference latency}+\text{radio latency} \qquad [\text{Equation 1}]$$

$$\text{Upperbound}=\text{PDB}-(\text{base station split AI/ML inference latency value}+\text{latency delivered to DN}) \qquad [\text{Equation 2}]$$

Next, the base station transmits to the device information on the set split point and latency value. The device performs inference based on information received from the base station. The procedure for adjusting the split point proposed in the present disclosure is implemented when the device performs a split inference operation between the device and the server one or more times based on the initially set split point using data collected/generated by the device.

Figure 12:
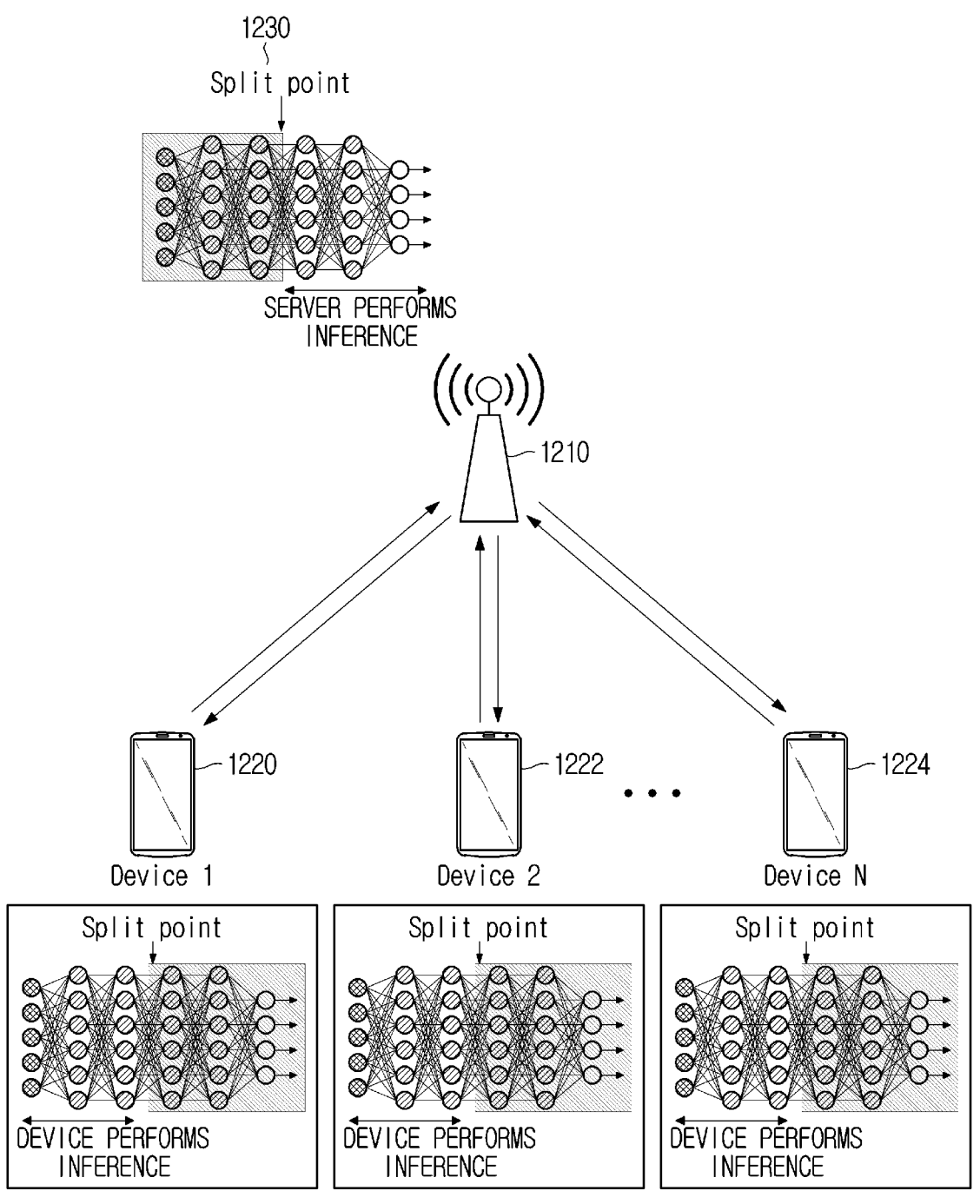
FIG. 12 illustrates an example in which a split AI/ML model is applied between a device and a server after initial setting of a split AI/ML model according to an embodiment of the present disclosure.

FIG. 12 illustrates an example in which a split AI/ML model is applied between a device and a server after initial setting of a split AI/ML model according to an embodiment of the present disclosure.

Referring to FIG. 12, a split AI/ML model between a plurality of devices 1220, 1222, and 1224 and a base station 1210 may be applied. For example, the base station may set the latency value of the device and a split point 1230 according to QoS set by a core network for a service to be provided. The base station may transmit, to the respective devices 1220, information on the set latency value and the split point 1230, 1222 and 1224. Each of the devices 1220, 1222 and 1224 may perform split inference on layers before the split point 1230 based on the received information. The base station 1210 may perform split inference on layers after the split point 1230. Split points initially set by the base station 1210 may be different or the same for each of the device 1220, 1222 and 1224, and may not be limited to a specific form.

As an example, a method of determining a split point by considering channel quality after initial settings will be described below. For example, the device may request the base station for uplink channel quality information. The device may receive, from the base station, uplink channel quality information based on the request for the above-described uplink channel quality information. For example, the device may check whether there is uplink channel quality information, request the base station for the uplink channel quality information when there is no uplink channel quality information, and receive it from the base station. The uplink quality channel information is used to adjust the split point.

As a specific example, a terminal may transmit, to a base station, a sounding reference signal (SRS), and the base station may acquire uplink channel quality information based on the SRS. After that, the base station may provide the acquired channel quality information based on the SRS to the terminal, and the terminal may obtain the uplink channel quality channel information through this and use it to adjust the split point. Also, as an example, the process of requesting and acquiring the uplink channel quality information by the terminal may be performed based on another method, and is not limited to the above-described embodiment.

When the service provided by the device and the base station operates normally while satisfying the QoS set through the core network, it can be regarded as maintaining constant channel quality. At this time, the device may determine whether to adjust the split point by comparing the channel quality information received from the base station with the previously maintained channel quality. For example, in order to determine the split point, the device may consider channel quality during transmission of intermediate data immediately before determination of the split point. The device may perform split inference for layers up to the split point determined according to whether the inference latency is satisfied based on the determined split point. For example, the device may perform inference if the inference latency for the layers up to the determined split point satisfies the latency of the device received from the base station. For example, the device may transmit, to the base station, a service performance impossibility message when the latency for the layers up to the determined split point exceeds the latency of the device received from the base station.

When inference latency is satisfied and split inference is performed, the device transmits, to the base station, split inference result information. The split inference result information may include at least one of intermediate data or data on an adjusted split point location. The base station may perform split inference on layers after the split point based on the received split inference result information, and then transmit, to the device, the split inference result information of the base station. For example, when the split point is adjusted to the output layer, since the device performs all inference, the device may transmit intermediate data when the base station requests intermediate data separately from transmitting data on the split point location.

Additionally, the device may consider a ratio of computing power occupied by the split AI/ML model to total computing power of the device to adjust the split point. The priority for the two parameters is '1. channel quality, 2. the ratio of computing power occupied by the split AI/ML model to the computing power of the device'.

As an example, the device may simultaneously perform various operations such as data generation/collection and OS operation, as well as performing split AI/ML. Therefore, through values related to the computing power of the device, such as memory (DRAM) and CPU (ALU, RF) usage, when the device performs split inference on layers up to the currently set split point location while a plurality of operations are performed, the ratio of computing power occupied by the split AI/ML model to the total computing power and the computation latency up to the corresponding split point may be checked. When the service provided by the device and the base station operates normally while satisfying the set QoS, the ratio of the computing power occupied by the split AI/ML model to the total computing power of the device is maintained constant, so that the computation latency up to the split point is maintained constant. The device may determine whether to adjust the split point based on the result of comparing the ratio of the computing power occupied by the split AI/ML model to the total computing power when the calculated computation latency and the split point are to be adjusted with the existing computing power ratio. The computing power of the device is not limited to the above embodiment.

quality between the device and the base station is maintained constant. Thus, the amount of buffered data of the device may be maintained constant. Accordingly, the mapped buffer size level may also be maintained constant. If the index for the buffer size level increases to a certain level or more, the uplink channel quality may deteriorate and the size of resources allocated from the uplink grant may decrease. In this case, the buffering data may increase because the device may not fully transmit the intermediate data. Parameters related to an index increment for the buffer size level and a time duration in which the increased index is maintained may be set by the base station or the device.

Table 2 below illustrates an operation in which the device determines a split point by considering channel quality and a ratio of computing power occupied by a split AI/ML model to total computing power of the device. The device determines whether to adjust the split by considering the channel quality and the ratio of the computing power occupied by the split AI/ML model to the total computing power of the device at a current point in time, based on channel quality at the time of immediately preceding intermediate data transmission and the ratio of the computing power occupied by the split AI/ML model to the total computing power of the device at a current point in time when the split point is to be adjusted.

TABLE 2

| | | computing power (ratio of split AI/ML model to total computing power) | | | |
| | | high (higher than before) | intermediate (same as before) | low (worse than before) | remarks |
|---|---|---|---|---|---|
| channel quality | high (better than before) | Move split point to the left or maintain split point | Move split point to the left or maintain split point | Move split point to the left | |
| | intermediate (same as before) | Maintain split point | Maintain split point | Maintain split point or cannot perform service | Maintained when inference latency upperbound assigned to device is satisfied Otherwise, notify base station that service cannot be performed |
| | low (worse than before) | Move split point to the right | Maintain split point or cannot perform service | Maintain split point or cannot perform service | |

If the device does not normally receive channel quality information from the base station, the following situation may occur.

The device generates intermediate data as much as an uplink grant resource allocated from the base station. Data remaining due to insufficient resources may be buffered. The device may convert a BS (buffer size) value of buffered data into buffer size levels in bytes. The device may generate a buffer status report (BSR) MAC control element (CE) for the buffer size level and transmit it when transmitting intermediate data to the base station through uplink. The base station may check the amount of data buffered in the device. Since the device generates/collects data periodically and continuously to normally provide services (AR, object detection), the same uplink grant may be delivered when the channel As an example, a method of determining a split point based on Table 2 described above will be described below.

As an example, a case in which channel quality is improved compared to the existing one and a ratio of the computing power occupied by the split AI/ML model to the total computing power of the device is increased may be considered.

At this time, when the channel quality is improved compared to the existing one and the ratio of the computing power occupied by the split AI/ML model to the total computing power of the device is increased, the device may maintain the split point or move the split point in the direction of the input layer. Through this, the split inference latency of the device may be reduced, and the latency for the service to be provided may also be reduced. For example, the device may generate intermediate data by performing split inference on layers up to the adjusted split point, and transmit, to the base station, the generated intermediate data. The device may adjust the split point in the direction of the input layer in consideration of whether it is channel quality satisfying the uplink data rate when transmitting the intermediate data to the base station. In the case of a corresponding situation, the base station may instruct movement or the device may determine movement by itself and perform movement.

As another example, a case in which channel quality deteriorates compared to the existing one but the ratio of the computing power occupied by the split AI/ML model to the total computing power of the device is increased may be considered.

When the channel quality of the service deteriorates compared to the existing one (when the data transmission rate is low), radio latency is highly likely to increase when the device transmits intermediate data to the base station. In this case, the device checks whether the ratio of the computing power occupied by the split AI/ML model to the total computing power has increased, and adjust the split point in the direction of the output layer upon determining that split inference is performed on the additional layer with the increased ratio. When the split point is adjusted in the direction of the output layer, the size of intermediate data that needs to be transmitted from the device to the base station is reduced, and thus the latency of the device and service may be reduced.

As another example, a case in which channel quality further deteriorates by various factors even if the split point is adjusted in the direction of the output layer in consideration of the deteriorated channel quality may be considered.

Since deterioration of channel quality is a factor that increases latency when the device wirelessly transmits intermediate data to the base station, the device may additionally adjust the split point in the direction of the output layer to reduce latency. In this case, the device may check whether the ratio of the computing power occupied by the split AI/ML model to the total computing power is still high, and may additionally adjust the split point in the direction of the output layer upon determining that split inference may be performed on the additional layer.

As another example, a case in which deterioration of channel quality is maintained or channel quality further deteriorates even after additionally adjusting the split point in the direction of the output layer may be considered.

When the ratio of the computing power occupied by the split AI/ML model to the total computing power continues to be higher than before so that the device may perform split inference on the additional layer, the device may perform interference by additionally adjusting the split point up to the output layer.

As another example, a case in which channel quality is improved compared to the existing one and the ratio of the computing power occupied by the split AI/ML model to the total computing power of the device is lowered may be considered.

When channel quality is improved compared to the existing one and the ratio of the computing power occupied by the split AI/ML model to the total computing power of the device is lowered, computation latency may increase when the device performs inference on layers up to the existing split point. Accordingly, the device may not satisfy the upperbound of inference latency received from the base station. At this time, the device may adjust the split point in the direction of the input layer to satisfy the PDB of the service.

As another example, a case in which channel quality deteriorates compared to the existing one and the ratio of the computing power occupied by the split AI/ML model to the total computing power of the device is lowered may be considered.

When channel quality deteriorates to the extent that the QoS requirements set for the corresponding service cannot be satisfied, and the ratio of computing power occupied by the split AI/ML model in the device is lowered, the device first determines whether inference latency received from the base station is capable of being satisfied. When the device determines that latency is satisfied, the device may maintain the split point, and if latency is not satisfied, the device may transmit, to the base station, an indicator indicating that the service cannot be performed.

In this case, the device may calculate computation latency generated whenever the device performs split inference for each layer according to the current computing power and transmit it to the base station. The base station may set a new initial split point based on the received information. The base station may transmit, to the device, information including at least one of a set split point or an upperbound value of latency consumed by the device. The device may perform split inference again based on information received from the base station.

Figure 13A:
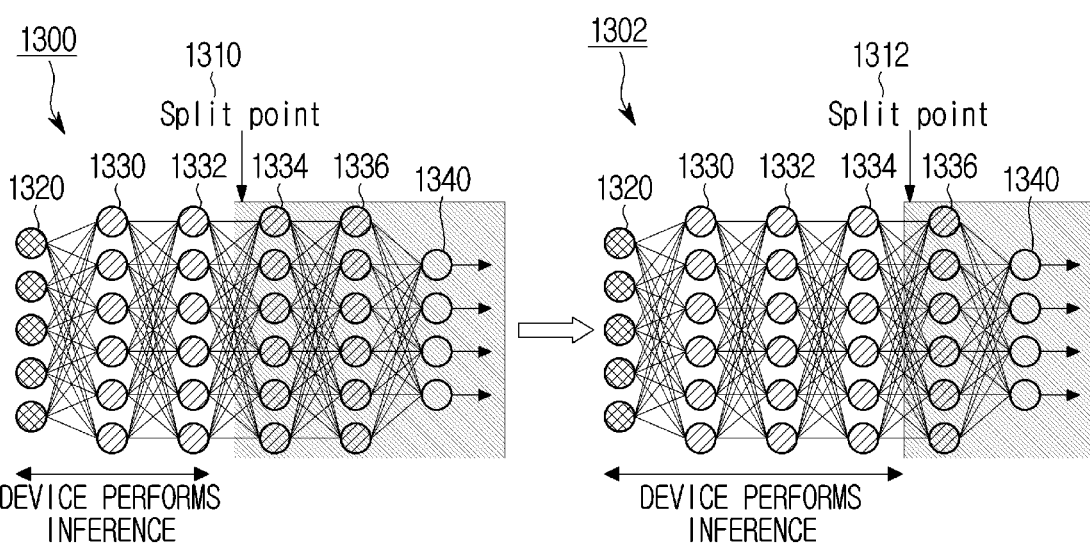
FIG. 13A illustrates an example in which a split point is adjusted in a direction of an output layer according to an embodiment of the present disclosure.
Figure 13B:
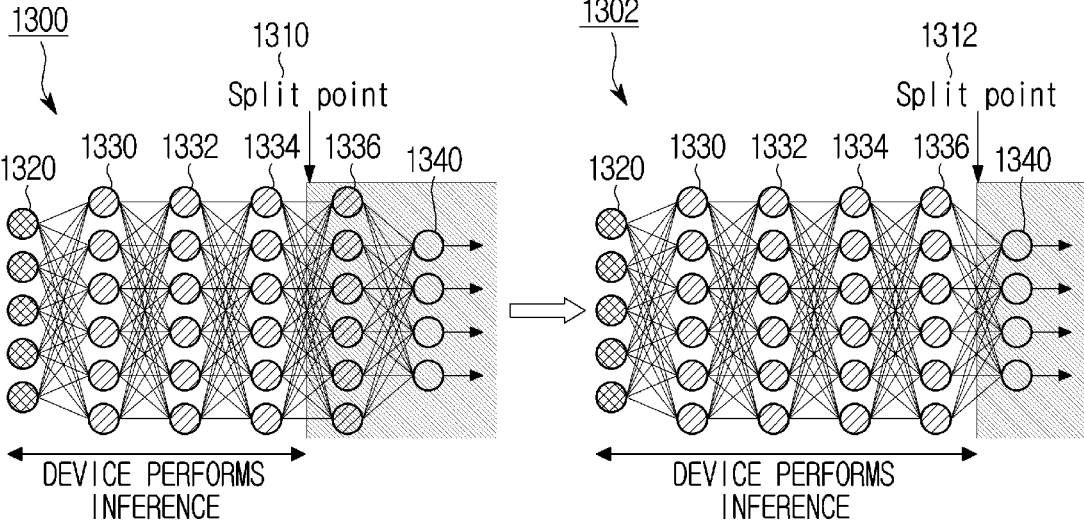
FIG. 13B illustrates an example in which a split point is adjusted in a direction of an output layer according to an embodiment of the present disclosure.
Figure 13C:
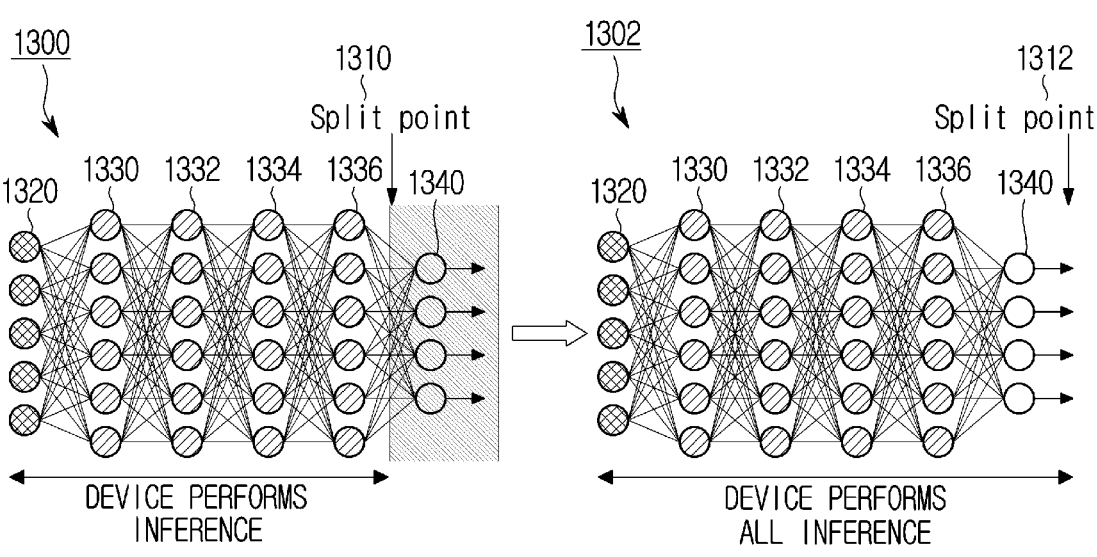
FIG. 13C illustrates an example in which a split point is adjusted in a direction of an output layer according to an embodiment of the present disclosure.

FIG. 13A, FIG. 13B and FIG. 13C illustrate an example in which a split point is adjusted in a direction of an output layer according to an embodiment of the present disclosure. FIG. 13 illustrates a method of operating a device having computing power (e.g., the AI server/device 140 of FIG. 1).

Referring to FIG. 13A, an existing split point 1310 was adjusted by one hidden layer 1334 in the direction of the output layer 1340. In the case of a split model 1300 before split point adjustment, the device may perform split inference on an input layer 1320 and hidden layers 1330 and 1332 up to the existing split point 1310. For a split model 1302 after split point adjustment, the device may perform split inference on the input layer 1320 and hidden layers 1330, 1332, 1334 up to the adjusted split point 1312. In this case, even if channel quality deteriorates, since the size of intermediate data generated while the device performs split inference on the additional hidden layer by the adjusted split point 1312 is reduced, latency generated when the device transmits, to the base station, intermediate data may be reduced.

Referring to FIG. 13B, after adjusting the split point in the direction of the output layer 1340, the split point was further adjusted in the direction of the output layer 1340. The existing split point 1310 was further adjusted by one hidden layer 1336 in the direction of the output layer 1340. In the case of the split model 1300 before split point adjustment, the device may perform split inference on the input layer 1320 and the hidden layers 1330, 1332, and 1334 up to the existing split point 1310. For the split model 1302 after split point adjustment, the device may perform split inference on the input layer 1320 and hidden layers 1330, 1332, 1334, 1336 up to the adjusted split point 1312. In this case, even if channel quality deteriorates, since the size of intermediate data generated while the device performs split inference on the additional hidden layer by the adjusted split point 1312 is reduced, latency generated when the device transmits, to the base station, intermediate data may be reduced.

Referring to FIG. 13C, after further adjusting the split point in the direction of the output layer 1340, the split point was adjusted up to the output layer 1340. In the case of the split model 1300 before split point adjustment, the device may perform split inference on the input layer 1320 and the hidden layers 1330, 1332, 1334, and 1336 up to the existing split point 1310. In the case of the split model after split point adjustment 1302, the device may perform inference on the input layer 1320 and the hidden layers 1330, 1332, 1334, 1336 as well as the output layer 1340 up to the adjusted split point 1312. That is, if the split point is adjusted up to the output layer 1340, all inferences may be performed in the device. The device, which has performed inference, may transmit, to the base station, data on the location of the adjusted split point 1312. Intermediate data may be transmitted by the device to the base station when the base station requests it from the device.

Figure 14:
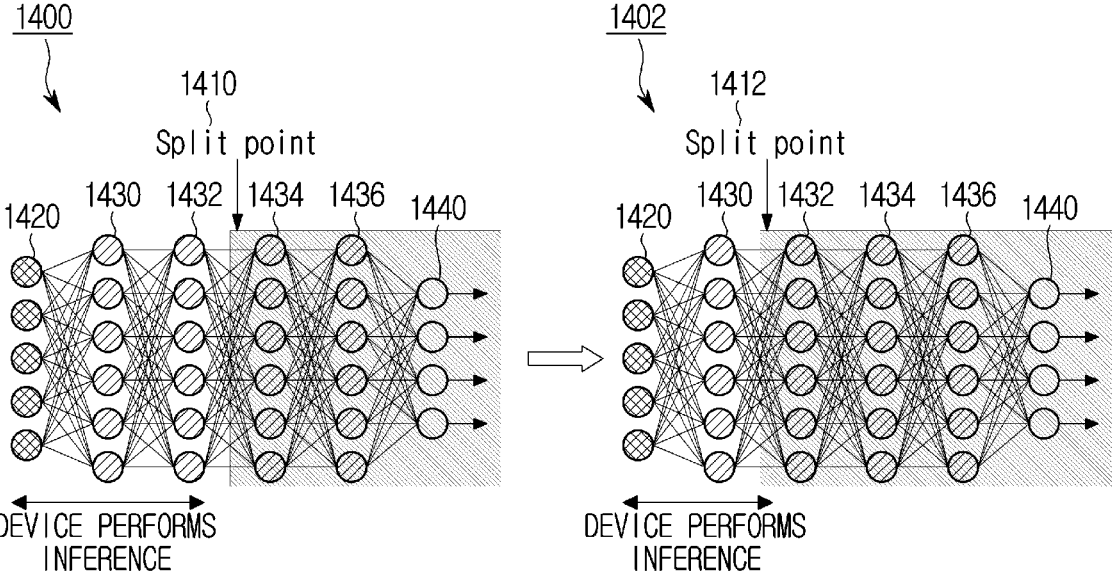
FIG. 14 illustrates an example in which a split point is adjusted in a direction of an input layer according to an embodiment of the present disclosure.

FIG. 14 illustrates an example in which a split point is adjusted in a direction of an input layer according to an embodiment of the present disclosure. FIG. 14 illustrates a method of operating a device having computing power (e.g., the AI server/device 140 of FIG. 1).

Referring to FIG. 14, an existing split point 1410 was adjusted by one hidden layer 1432 in a direction of an input layer 1420. In the case of a split model 1400 before split point adjustment, the device may perform split inference on the input layer 1420 and hidden layers 1430 and 1432 up to the existing split point 1410. In the case of a split model 1402 after split point adjustment, the device may perform split inference on the input layer 1420 and the hidden layer 1430 up to the adjusted split point 1412. For example, although channel quality is improved more than before when the device performs split inference up to the existing split point 1410, if the ratio of the computing power occupied by the split AI/ML model to the total computing power of the device is lowered when calculating the computing power of the device when the device performs split inference up to the existing split point 1410, computation latency of the device up to the existing split point 1410 may increase. Accordingly, the device may reduce the computation latency of the device by adjusting the split point in the direction of the input layer.

When the device adjusts the split point in the direction of the input layer, in order to preserve privacy for raw data, the split point may be adjusted only up to a layer which may go through an activation function at least once. For example, when the split point is adjusted to after the first hidden layer 1430 immediately after the input layer 1420 and the ratio of the computing power occupied by the split AI/ML model to the total computing power of the device is lowered, and it is calculated that the device cannot perform inference while satisfying inference latency received from the base station, the device may transmit, to the base station, an indicator indicating that the corresponding service cannot be performed. For example, the split point was adjusted to after the first hidden layer 1430 immediately after the input layer 1420, and the ratio of the computing power occupied by the split AI/ML model to the total computing power of the device was lowered, but it is calculated that the device can perform inference while satisfying inference latency received from the base station, the device may maintain the split point and perform the split inference operation.

Figure 15:
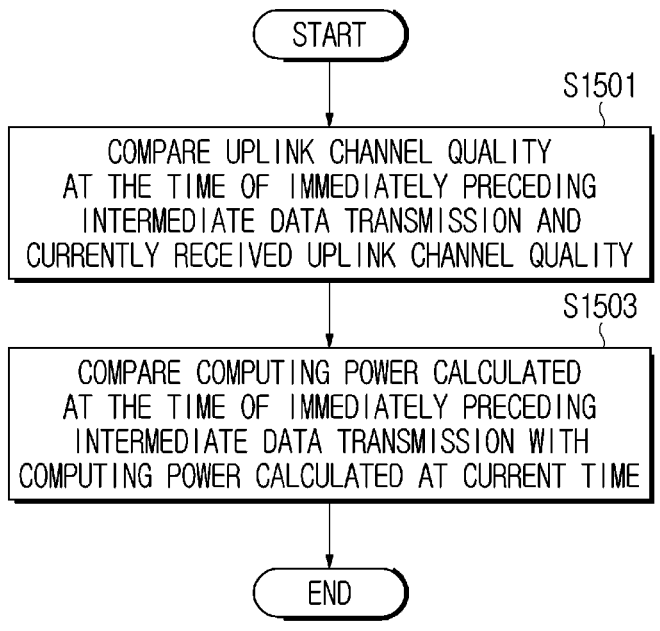
FIG. 15 illustrates an example of a procedure for determining whether to adjust a split point related to Table 2 according to an embodiment of the present disclosure.

FIG. 15 illustrates an example of a procedure for determining whether to adjust a split point related to Table 2 according to an embodiment of the present disclosure. FIG. 15 illustrates a method of operating a device having computing power (e.g., the AI server/device 140 of FIG. 1).

Referring to FIG. 15, the device may determine whether to adjust the split in consideration of channel quality received by the device and computing power of the device at a current point in time when the split point is to be adjusted, based on channel quality and a ratio (hereinafter "computing power") of computing power occupied by a split AI/ML model to total computing power of the device at a point in time of an immediately preceding intermediate data transmission.

In step S1501, the device may compare uplink channel quality at the time of immediately preceding intermediate data transmission and uplink channel quality received by the device at a current time when the split point is to be adjusted.

In step S1503, the device may compare the computing power calculated at the time of immediately preceding intermediate data transmission of the device with the computing power of the device calculated at the current time when the split point is to be adjusted.

For example, the device may maintain the split point or adjust the split point in the direction of the input layer, when the received channel quality and computing power at the current time are higher than the channel quality and computing power at the time of immediately preceding intermediate data transmission. In this case, when the split point is moved in the direction of the input layer to reduce the inference latency of the device, if the split point is located after the first hidden layer, the device shall maintain the split point.

For example, the device may maintain the split point or adjust the split point in the direction of the input layer, when the received channel quality at the current time is higher than the channel quality at the time of immediately preceding intermediate data transmission and the computing power at the current time is the same as the computing power at the time of immediately preceding intermediate data transmission. In this case, when the split point is moved in the direction of the input layer to reduce the inference latency of the device, if the split point is located after the first hidden layer, the device shall maintain the split point.

For example, the device may determine whether the location of the existing split point is after a first hidden layer, when the received channel quality at the current time is higher than the channel quality at the time of immediately preceding intermediate data transmission and the computing power at the current time is lower than the computing power at the time of immediately preceding intermediate data transmission. If the existing split point is not located immediately after the input layer, the device may move the split point in the direction of the input layer. At this time, the device may adjust the split point only after the input layer to preserve the privacy of raw data inserted into the input layer.

For example, the device may maintain the split point when the received channel quality at the current time is the same as the channel quality at the time of immediately preceding intermediate data transmission and the computing power at the current time is higher than the computing power at the time of immediately preceding intermediate data transmission.

For example, the device may maintain the split point when the received channel quality and computing power at the current time are the same as the channel quality and computing power at the time of immediately preceding intermediate data transmission.

For example, when the received channel quality at the current time is equal to the channel quality at the time of immediately preceding intermediate data transmission and the computing power at the current time is lower than the computing power at the time of immediately preceding intermediate data transmission, the device may determine whether the split inference latency for the layers up to the existing split point satisfies the upperbound of the inference latency of the device received from the base station. If the split inference latency of the layers up to the existing split point is equal to or smaller than the upperbound value of the inference latency of the device received from the base station, the device may maintain the split point. If the split inference latency of the layers up to the existing split point is greater than the upperbound of the inference latency of the device received from the base station, the device may transmit, to the base station, an indicator indicating that the service cannot be performed.

For example, when the received channel quality at the current time is lower than the channel quality at the time of intermediately preceding intermediate data transmission and the computing power at the current time is higher than the computing power at the time of immediately preceding intermediate data transmission, the device may determine whether the location of the existing split point is after the output layer. If the location of the existing split point is after the output layer, the device may maintain the split point. If the location of the existing split point is before the output layer, the device may move the split point in the direction of the output layer.

For example, when the received channel quality at the current time is lower than the channel quality at the time of immediately preceding intermediate data transmission and the computing power at the current time is equal to the computing power at the time of immediately preceding intermediate data transmission, the device may determine whether the split inference latency for the layers up to the existing split point satisfies the upperbound of the inference latency of the device received from the base station. If the split inference latency of the layers up to the existing split point is equal to or smaller than the upperbound value of the inference latency of the device received from the base station, the device may maintain the split point. If the split inference latency of the layers up to the existing split point is greater than the upperbound value of the inference latency of the device received from the base station, the device may transmit, to the base station an indicator indicating that the service cannot be performed.

For example, when the received channel quality and computing power at the current time is lower than the channel quality and computing power at the time of immediately preceding intermediate data transmission, the device may whether the split inference latency for the layers up to the existing split point satisfies the upperbound of the inference latency of the device received from the base station. If the split inference latency of the layers up to the existing split point is equal to or smaller than the upperbound value of the inference latency of the device received from the base station, the device may maintain the split point. If the split inference latency of the layers up to the existing split point is greater than the upperbound value of the inference latency of the device received from the base station, the device may transmit, to the base station, an indicator indicating that the service cannot be performed.

For example, when the received channel quality and computing power at the current time are lower than the channel quality and computing power at the time of immediately preceding intermediate data transmission, upon determining that the service cannot be provided through the split AI/ML model, the device may transmit, to the base station, an indicator indicating that the service cannot be performed. Specifically, even though the split point was adjusted immediately after the input layer, when the ratio of the computing power occupied by the split AI/ML model to the total computing power of the device is lowered and thus it is calculated that the device cannot perform inference while satisfying the inference latency received from the base station, the device may transmit, to the base station, an indicator indicating that the corresponding service cannot be performed.

Figure 16:
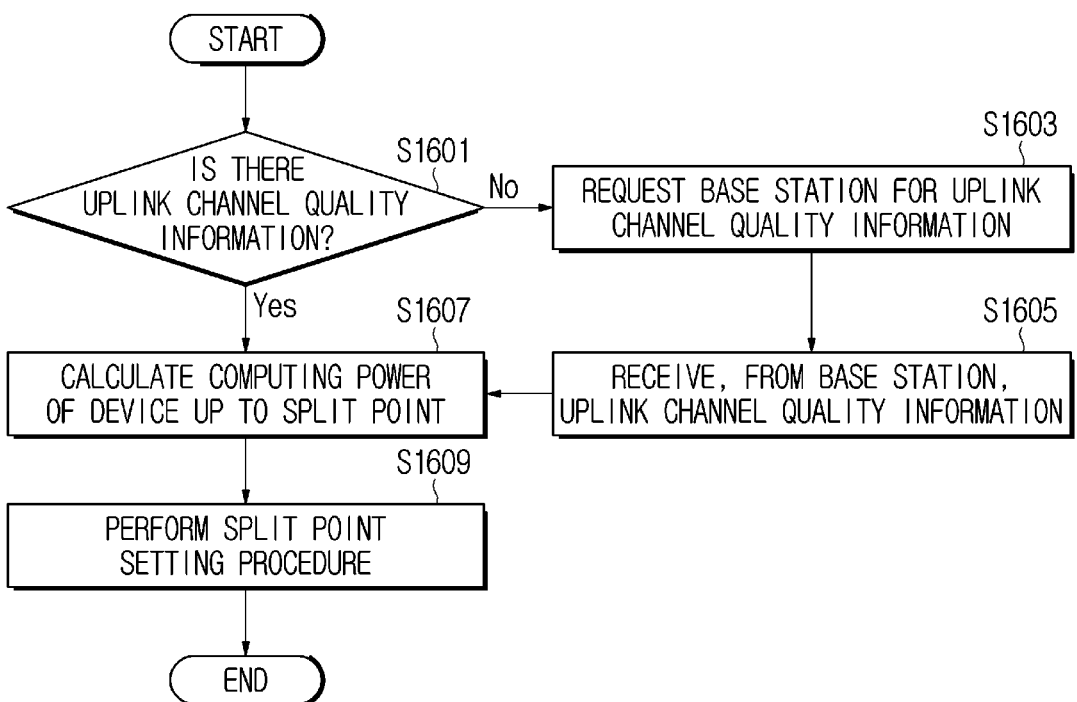
FIG. 16 illustrates an example of an initial setting procedure for adjusting a split point according to an embodiment of the present disclosure.

FIG. 16 illustrates an example of an initial setting procedure for adjusting a split point according to an embodiment of the present disclosure. FIG. 16 illustrates a method of operating a device having computing power (e.g., the AI server/device 140 of FIG. 1).

Referring to FIG. 16, in step S1601, the device may check whether there is uplink channel quality information. If there is no uplink channel quality information, the device may request the base station for uplink channel quality information in step S1603. In step S1605, the device may receive, from the base station, uplink channel quality information requested. The order of steps S1601, S1603, S1605, and S1607 may be changed or the same. However, the order of steps S1603 and S1605 is fixed. For example, the device may calculate the computing power of the device up to the existing split point in step S1607 while checking the uplink channel quality information. The calculated computing power values may include at least one of computation latency, arithmetic logic unit (ALU), register file, dynamic random access memory (DRAM), or computing power values occupied by the split AI/ML model. Then, in step S1609, the device may perform a split point setting procedure based on the uplink channel quality information and the calculated computing power values.

Figure 17:
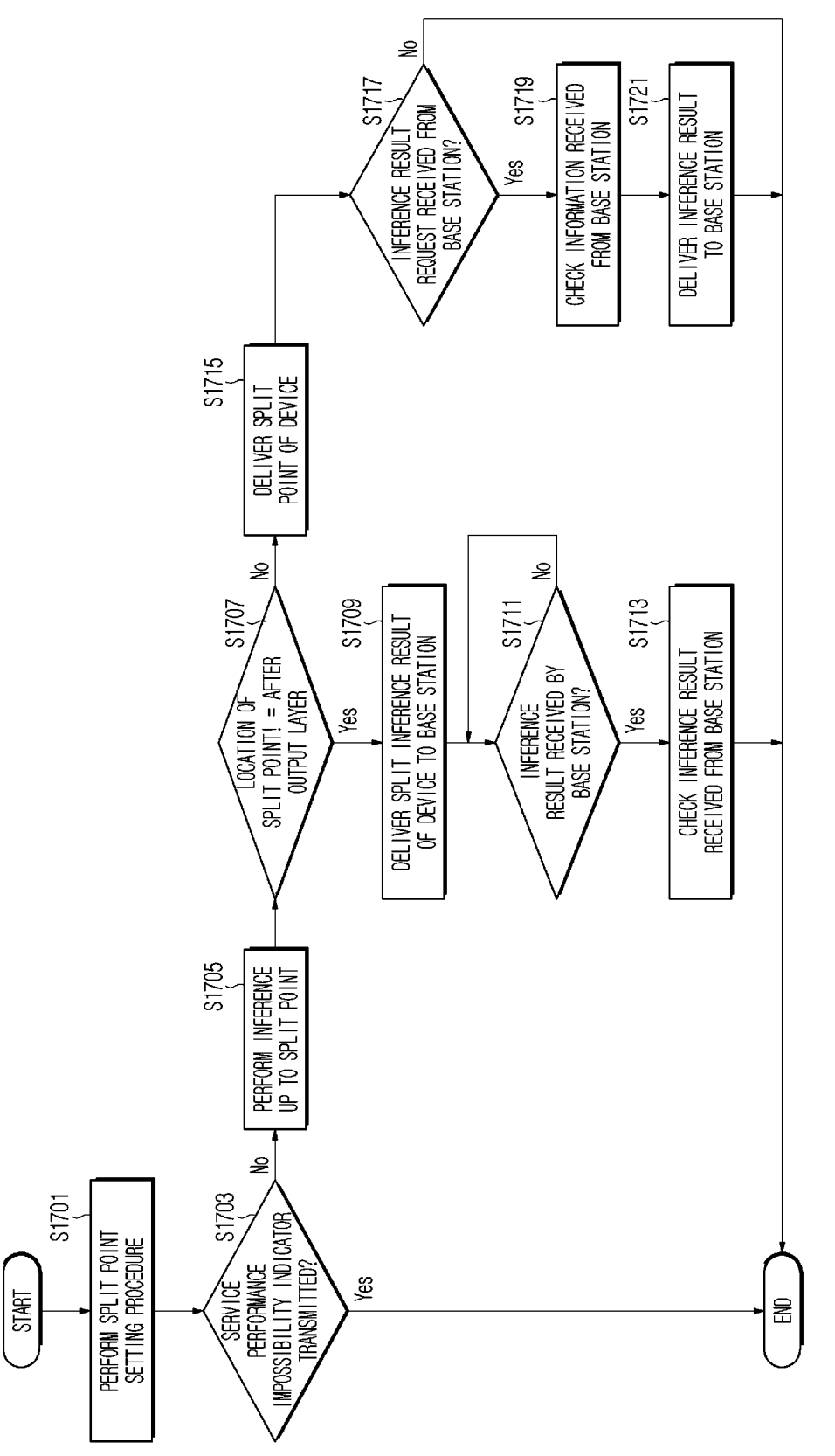
FIG. 17 illustrates an example of an inference operating procedure of a device after a split point adjustment procedure according to an embodiment of the present disclosure.

FIG. 17 illustrates an example of an inference operating procedure of a device after a split point adjustment procedure according to an embodiment of the present disclosure. FIG. 17 illustrates operations from the perspective of a device included in a procedure between a device related to split point adjustment and a base station. FIG. 17 illustrates a method of operating a device having computing power (e.g., the AI server/device 140 of FIG. 1).

Referring to FIG. 17, in step S1701, the device performs a split point adjustment procedure according to the procedure of FIG. 16 based on uplink channel quality and a ratio of the computing power occupied by the split AI/ML model to total computing power of the device. After performing the split point setting procedure, the device may check whether a service performance impossibility indicator of step S1703 has been transmitted. In step S1705, if the device didn't transmit the service performance impossibility indicator, the device may perform split inference for layers up to the adjusted split point.

In step S1707, the device may determine whether the location of the adjusted split point is after an output layer. If the location of the adjusted split point is after the output layer, in step S1715, the device may deliver adjusted split point information to the base station. At this time, the device may also transmit, to the base station, an uplink channel quality information request message for new split point adjustment. In step S1717, the device may determine whether an inference result information request message of the base station has been received. If the device has received the inference result information request message from the base station, in step S1719, the device may check the information received from the base station. The received information may include uplink channel quality information, and in step S1721, the device may deliver inference result information to the base station.

If the location of the adjusted split point is before the output layer, in step S1709, the device may transmit, to the base station, split inference result information of the device for the layers up to the adjusted split point. The split inference result information of the device may include intermediate data, location data of the adjusted split point, and an uplink channel quality request message for split point adjustment. Based on the split inference result information received from the device, the base station may perform split inference for layers from the adjusted split to the output layer. In step S1711, the device may determine whether split inference result information of the base station has been received from the base station. For example, the device may check whether inference result information has been received from the base station based on the feedback, and is not limited to a specific form. The split inference result information of the base station may include uplink channel quality data and upperbound value data of inference latency of the device. If the device has received the inference result information from the base station, in step S1713, the device checks the split inference result information received from the base station, updates the existing information based on the received result, and then use the updated information for next split adjustment.

Figure 18:
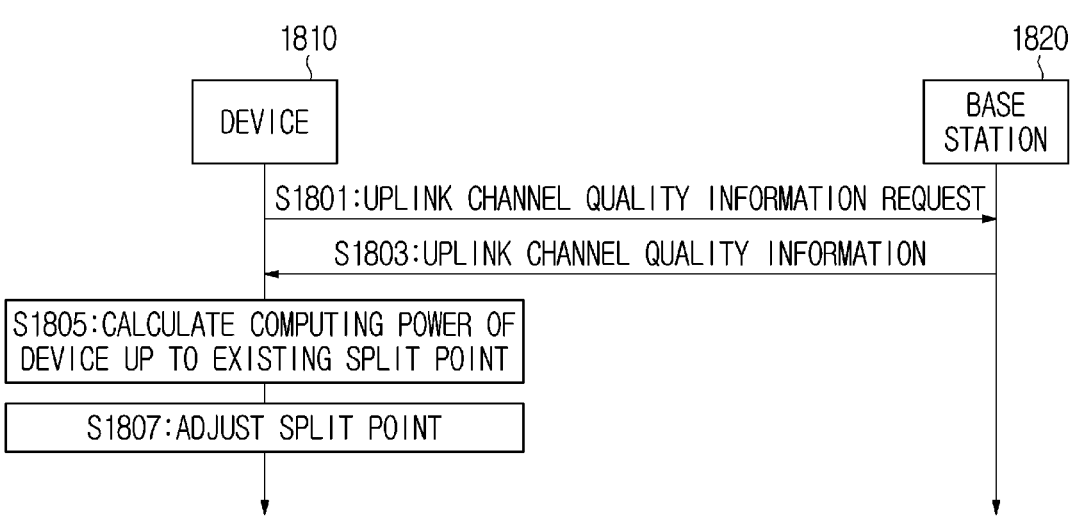
FIG. 18 illustrates an example of a procedure for adjusting a split point according to an embodiment of the present disclosure.

FIG. 18 illustrates an example of a procedure for adjusting a split point according to an embodiment of the present disclosure. FIG. 18 illustrates a method of operating a device having computing power (e.g., the AI server/device 140 of FIG. 1).

Referring to FIG. 18, in step S1801, a device 1810 may request uplink channel quality information. The device 1810 may check whether there is uplink channel quality information and request the base station for 1820 the uplink channel quality information if there is no uplink channel quality information. The device 1810 may request uplink channel quality information through an SRS or a control message.

In step S1803, the device 1810 may receive, from the base station 1820, channel quality information requested. The channel quality information may be transmitted through downlink control information (DCI) or a control message. The channel quality information is used for split point adjustment.

In step S1805, the device 1810 may additionally calculate computing power of the device for layers up to the existing split point in order to adjust the split point. The device 1810 may calculate a ratio of the computing power occupied by the split AI/ML model to the total computing power of the device.

In step S1807, the device 1810 may adjust the split point. The device 1810 may maintain or change the location of the split point based on channel quality and the ratio of the computing power occupied by the split AI/ML model to the total computing power of the device.

The order of steps S1801, S1803, and S1805 may be changed and may be performed simultaneously. However, step S1803 shall be performed after step S1801.

Figure 19:
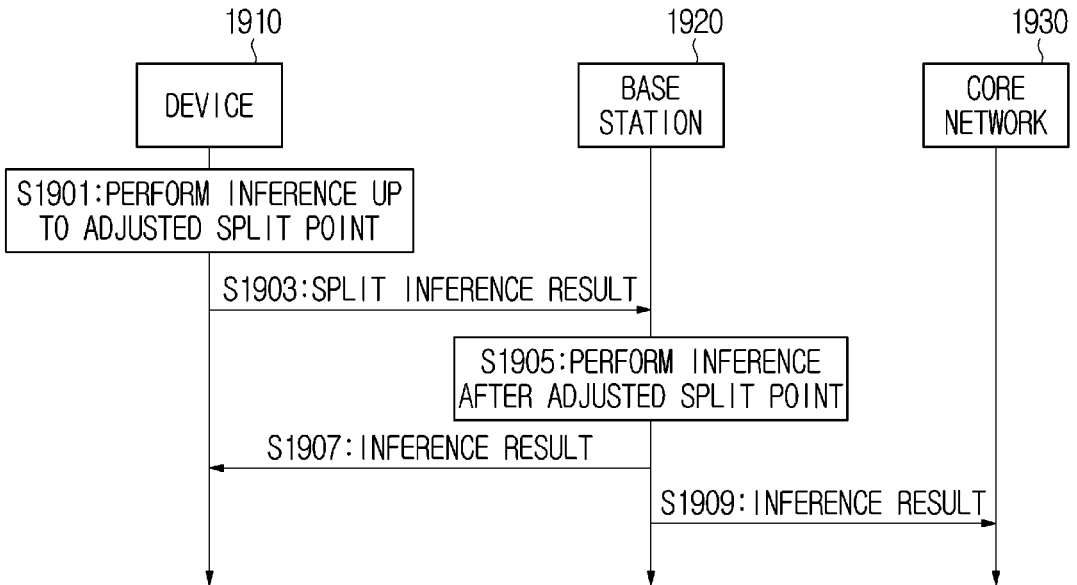
FIG. 19 illustrates an example of a procedure for performing inference when a split point is adjusted to before an output layer according to an embodiment of the present disclosure.

FIG. 19 illustrates an example of a procedure for performing inference when a split point is adjusted to before an output layer according to an embodiment of the present disclosure. FIG. 19 illustrates a method of operating a device having computing power (e.g., the AI server/device 140 of FIG. 1).

Referring to FIG. 19, in step S1901, a device 1910 performs split inference on layers from an input layer to an adjusted split point. The device 1910 may generate intermediate data as a result of the split inference. At this time, as an example, the device may be able to perform split inference based on the foregoing. That is, the device may be in a state in which the service performance impossibility indicator is not transmitted to the base station, and may perform split inference based on this.

Also, as an example, a case where the location of the split point is not after an output layer may be considered. That is, when the split point is before the output layer, in step S1903, the device 1910 transmits, to a base station 1920, split inference result information. For example, the split inference result information may include at least one of intermediate data, split point location, or indicator information. As a specific example, the split inference result information may include intermediate data that is a result of the device 1910 performing split inference on layers from an input layer to an adjusted split point, and adjusted split point data. Also, as an example, the device 1910 may also request the base station 1920 for uplink channel quality information for new split point adjustment, and is not limited to a specific form.

In step S1905, the base station 1920 may perform split inference on layers after the adjusted split point based on the split inference result received from the device. The base station 1920 may generate labels by performing split inference. In step S1907, the base station 1920 may transmit, to the device 1910, split inference result information. In this case, as an example, the inference result information may include at least one of information on labels or information on an inference latency upperbound usable by the device. Also, as an example, the base station 1920 may transmit, to the device 1910, the interference latency upperbound value data of the device together with the inference result information. Also, as an example, the base station 1920 may transmit inference result information to the core network 1930. The core network 1930 may transmit, to a data network (DN), the received inference result information, through which the core network may also recognize the result of performing the inference. For example, steps S1907 and S1909 may be performed simultaneously or the order may be changed.

Since the base station 1920 performs inference on fewer layers than before when the split point is adjusted in the direction of the output layer, the base station 1920 transmits the inference result information to the device 1910 together with the upperbound of the latency that may be consumed in the device 1910 is set higher. If the split point is adjusted in the direction of the input layer, since the base station 1920 performs split inference for more layers than before, the base station transmits inference result information to the device 1910 together with the upperbound of the latency that may be consumed in the device 1910 is set lower.

Figure 20:
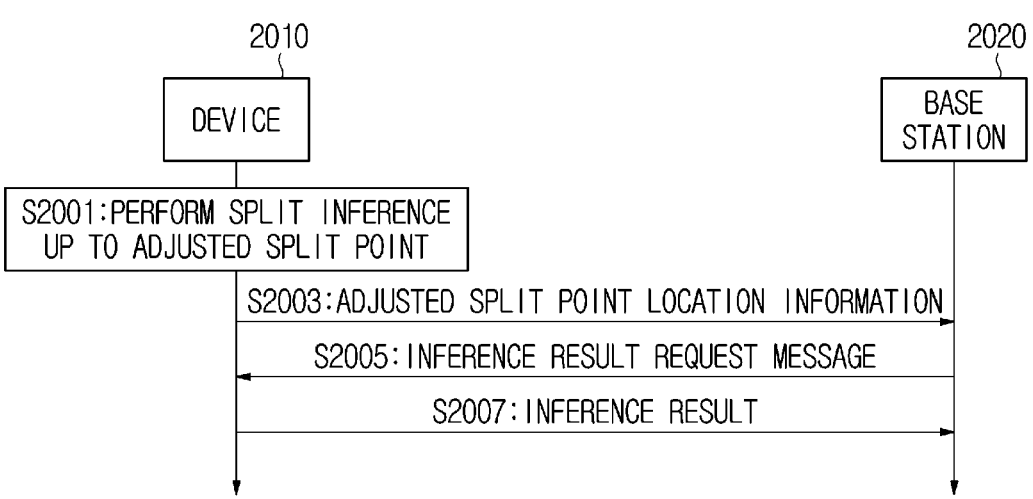
FIG. 20 illustrates an example of a procedure for performing inference when a split point is adjusted to after an output layer according to an embodiment of the present disclosure.

FIG. 20 illustrates an example of a procedure for performing inference when a split point is adjusted to after an output layer according to an embodiment of the present disclosure. FIG. 20 illustrates a method of operating a device having computing power (e.g., the AI server/device 140 of FIG. 1).

Referring to FIG. 20, in step S2001, a device 2010 performs split inference on layers from an input layer to an adjusted split point. For example, in FIG. 20, the device may be able to perform split inference based on the foregoing. That is, the device may be in a state in which the service performance impossibility indicator is not transmitted to a base station, and may perform split inference based on this. Here, the split point may be an output layer location. That is, the device 2010 may perform split inference from an input layer to an output layer. The device 2010 may generate a label as a result of split inference.

In step S2003, the device 2010 may transmit, to the base station 2020, the adjusted split point location data. Here, the split point location data may include at least one of split point location information or indicator information. Also, as an example, the device 2010 may together request the base station 2020 for uplink channel quality information for new split point adjustment.

Next, in step S2005, the base station 2020 may transmit, to the device, an inference result request message requesting an inference result of the device. The device 2010 may check whether a request for inference result information is received from the base station. For example, if the device has received a request for inference result information from the base station 2020, in step S2007, the device 2010 may transmit, to the base station 2020, the inference result information. That is, the device may deliver inference result information when receiving the request the base station for inference result information. If the base station 2020 does not request inference result information, the device 2010 may not transmit, to the base station 2020, the inference result information.

Figure 21:
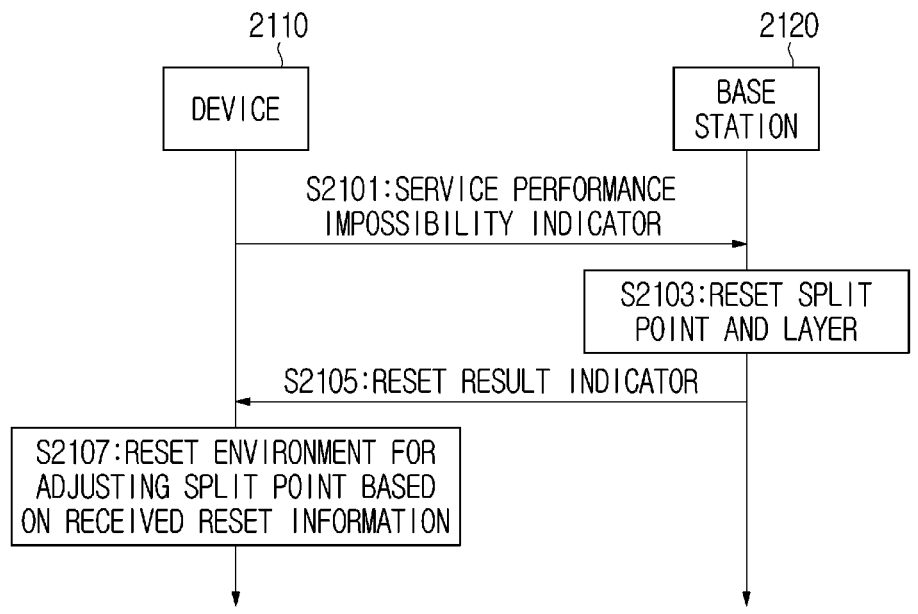
FIG. 21 illustrates an example of a split model reset operation procedure when split inference cannot be performed according to an embodiment of the present disclosure.

FIG. 21 illustrates an example of a split model reset operation procedure when split inference cannot be performed according to an embodiment of the present disclosure. FIG. 21 illustrates a method of operating a device having computing power (e.g., the AI server/device 140 of FIG. 1).

Referring to FIG. 21, in step S2101, a device 2110 may transmit, to the base station 2120, an indicator indicating that a service cannot be performed, upon determining that the service cannot be provided through a split AI/ML model. For example, even though the split point is adjusted to immediately after the input layer, the ratio of the computing power occupied by the split AI/ML model to the total computing power of the device 2110 is lowered and thus it is calculated that the device 2110 cannot perform inference while satisfying the inference latency received from the base station 2120, the device 2110 may transmit, to the base station 2120, an indicator indicating that the corresponding service cannot be performed.

In step S2103, the base station 2120, which has received the service performance impossibility indicator, may reset an initial split point and a layer for new split point adjustment. For example, the base station 2120 may reset the split point to provide a corresponding service according to the QoS set by the core network. Also, as an example, the base station 2120 may reset the upperbound of the latency of the device and the layer layer. The latency of the device may include latency occurring when the device performs inference and latency occurring when the device transmits data wirelessly.

In step S2105, the base station 2120 may transmit, to the device 2110, a reset result indicator. The reset result indicator may include information on the reset split point, latency value, and reset layer.

In step S2107, the device 2110 may reset an environment for newly setting a split point based on the reset result received from the base station 2120. For example, as the layer, the latency value allowed for the device, and the initial split point are changed, the ratio of the computing power occupied by the split AI/ML model to the total computing power of the device may also be changed. Accordingly, since the ratio of the computing power of the device at the time when the immediately preceding intermediate data as the reference is transmitted is also changed, the environment for adjusting the split point may be reset.

Figure 22:
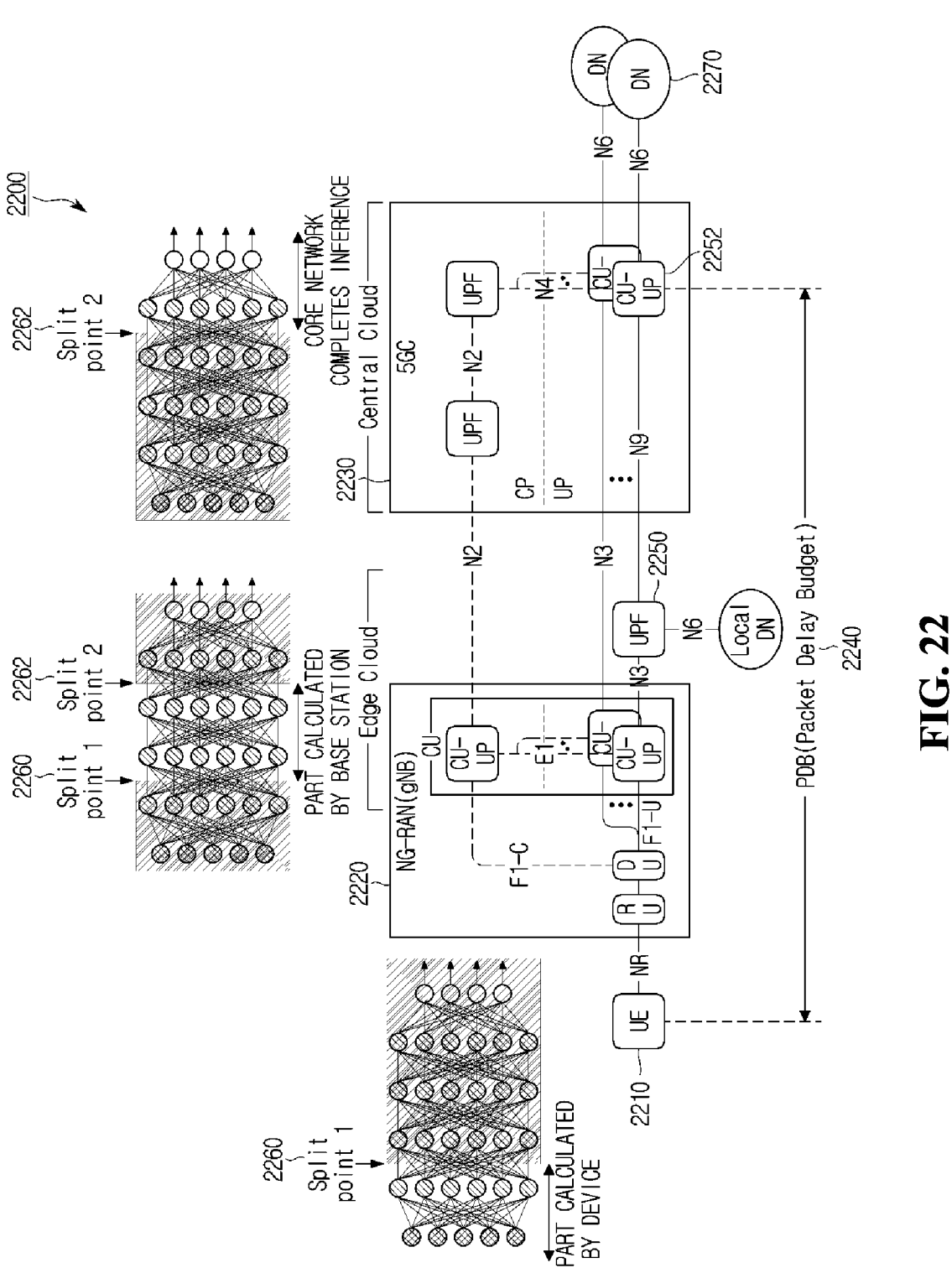
FIG. 22 illustrates an example of a system for building a split model through split point adjustment between a device, a base station, and a core network according to an embodiment of the present disclosure.

FIG. 22 illustrates an example of a system for building a split model through split point adjustment between a device, a base station, and a core network according to an embodiment of the present disclosure. FIG. 22 illustrates a method of operating a device having computing power (e.g., the AI server/device 140 of FIG. 1).

Referring to FIG. 22, a system 2200 may operate based on a device 2210, a base station 2220, and a core network 2230. As a specific example, the base station may perform an edge cloud function and the core network may perform a central cloud function, but may not be limited thereto. For example, in the base station 2220, user plane functions (UPFs) 2250 and 2252 of the core network 2230 may be distributed. Accordingly, the base station 2220 may operate with a plurality of devices for which the AI/ML model is built in addition to the basic operation, thereby providing low latency to the devices. The split model may be built between device 2210 and base station 2220 by default. The device 2210 may perform split inference for layers up to the set first split point 2260, and the base station 2220 may perform split inference for layers after the first split point 2260. The base station 2220 may not set an additional split point, upon determining that the PDB 2240 may be satisfied, in performing split inference up to the output layer and transmitting the inference result information to the UPF of the core network.

However, the base station 2220 may be connected to a plurality of devices 2210 N:1. As the number of devices 2210 increases, the ratio of the computing power occupied by the split AI/ML model to the total computing power of the base station 2220 may decrease when the computing power of the base station 2220 is calculated. In this case, the sum of the split inference latency after the first split point 2262 of the base station 2220 and the latency for the interface of the UPF located between the base station 2220 and the core network 2230 may exceed latency from the base station 2220 to the UPF 2252 of the core network 2230.

In the above case, the base station 2220 may set a second split point 2262 in consideration of the PDB 2240 configured for QoS. The base station 2220 may perform split inference only on some layers after the first split point 2260 and deliver the split inference result to the core network 2230. The result of performing split inference may include intermediate data which is split inference result information for layers from the first split point 2220 to the second split point 2240 and second split point 2262 information. The core network 2230 may perform inference on layers subsequent to the second split point 2262, and deliver labels, which are inference result information, to the base station 2220 and an application server located at a DN 2270 connected through an interface after the UPF 2252 of the core network 2230.

Figure 23:
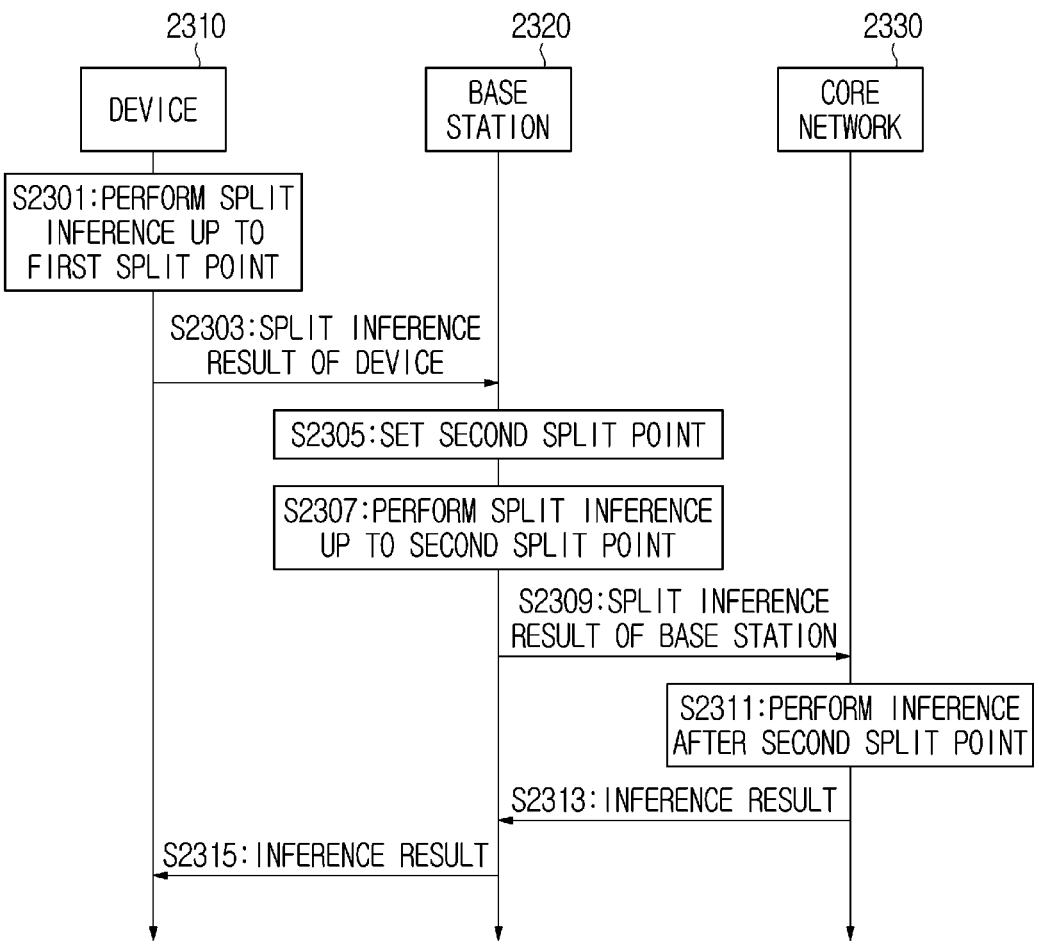
FIG. 23 illustrates an example of an operation procedure of a split AI/ML model through additional setting of a split point between a base station and a core network according to an embodiment of the present disclosure.

FIG. 23 illustrates an example of an operation procedure of a split AI/ML model through additional setting of a split point between a base station and a core network according to an embodiment of the present disclosure. FIG. 23 illustrates a method of operating a device having computing power (e.g., the AI server/device 140 of FIG. 1).

For example, in FIG. 23, if there is no uplink channel quality information, a device may request uplink channel quality information from the base station as in FIG. 18 described above. In addition, the device may calculate the computing power of the device up to the split point and perform a split point adjustment procedure, as shown in FIG. 18.

Also, as an example, in FIG. 23, the device may be able to perform split inference based on the foregoing. That is, the device may be in a state in which the service performance impossibility indicator is not transmitted to the base station, and perform split inference based on this.

Referring to FIG. 23, in step S2301, the device 2310 may perform split inference on layers up to a first split point. The first split point may include an existing split point initially set by the base station 2320 or a split point adjusted based on channel quality and computing power.

In step S2303, the device 2310 may transmit, to the base station 2320, split inference result information of the device. The split inference result information of the device 2310 may include first intermediate data and first split point data generated by the device 2310 performing inference on layers from an input layer to a first split point.

In step S2305, the base station 2320 may set a second split point. After receiving the first split point data from the device 2310, the base station 2320 may calculate computing power of the base station 2320 from a layer after the first split point to an output layer. The base station 2320 may set a second split point upon determining that computing power for performing split inference on layers from the first split point to the output layer is insufficient. For example, the base station 2320 may set the second split point when the sum of the inference latency of the base station 2320 and the latency between the base station 2320 and the core network 2330 exceeds a PDB. If the computing power of the base station is sufficient to perform inference from the first split point to the output layer, the base station may not set the second split point.

In step S2307, if the second split point is set, the base station 2320 may perform split inference on layers from a layer after the first split point to the second split point. The base station 2320 may transmit, to the core network 2330, split inference result information of the base station in step S2309 as a result of performing the split inference. The split inference result information of the base station 2320 may include second intermediate data and second intermediate data generated by the base station 2320 performing inference on the layers from the layer after the first split point to the second split point. The core network 2330 may perform split inference depending on whether the second split point data is received from the base station 2320. For example, if the core network 2330 has not received the second split point data from the base station 2320, the core network 2320 may not perform split inference.

In step S2311, when the second split point data is received from the base station 2320, the core network 2330 may perform split inference on layers from the layer after the second split point to the output layer. Through this, the core network 2330 may generate a label.

In step S2313, the core network 2330 may transmit, to the base station 2320, inference result information. The inference result information may include label data and inference latency data usable by the device. Also, as an example, the core network 2330 may transmit inference result information to a DN.

In step S2315, the base station 2330 may transmit the inference result information received from the core network 2330 to the device 2310. At this time, the base station may also transmit uplink channel quality information for new split point adjustment.

Figure 24:
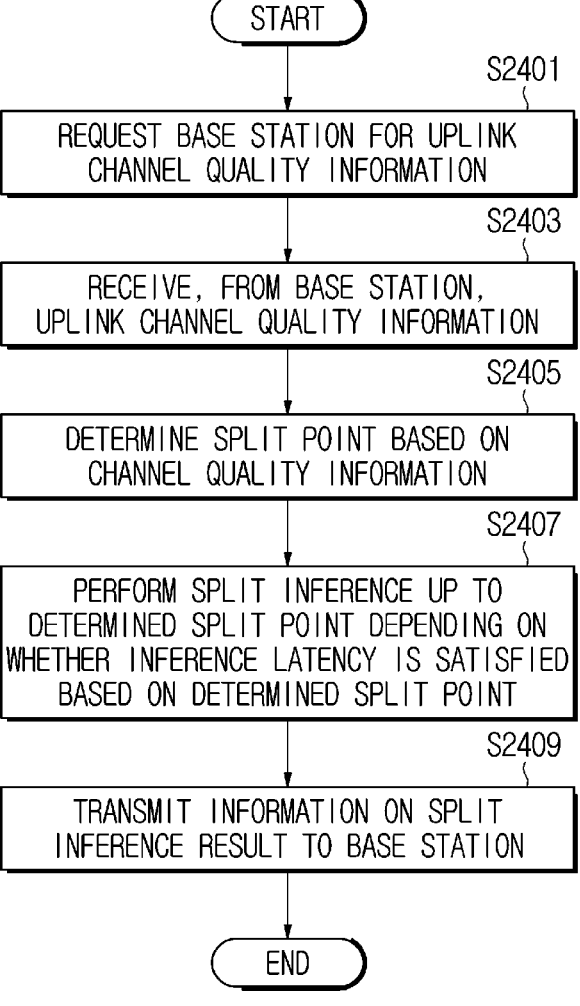
FIG. 24 illustrates an example of a procedure for adjusting a split point according to one embodiment of the present disclosure.

FIG. 24 illustrates an example of a procedure for adjusting a split point according to one embodiment of the present disclosure. FIG. 24 illustrates a method of operating a device having computing power (e.g., the AI server/device 140 of FIG. 1).

Referring to FIG. 24, in step S2401, a device may request a base station for uplink channel quality information. In step S2403, the device receives, from the base station, uplink channel quality information based on the above-described uplink channel quality information request. For example, the device may check whether there is uplink channel quality information, and if there is no uplink channel quality information, request the uplink channel quality information from the base station and receive it from the base station. The uplink quality channel information is used to adjust the split point.

In step S2405, the device may determine a split point based on the channel quality information received from the base station. Also, as an example, the device may determine the split point by further considering the channel quality information of the device and the computing power of the device, as described above. When the service provided by the device and the base station operates normally while satisfying the QoS set through the core network, it may be regarded as maintaining constant channel quality. At this time, the device may determine whether to adjust the split point by comparison with the previously maintained channel quality based on the channel quality information received from the base station. For example, in order to determine the split point, the device may consider channel quality during transmission of intermediate data immediately before the split point is determined.

In step S2407, the device may perform split inference for layers up to the split point determined depending on whether the inference latency is satisfied based on the determined split point. For example, the device may perform inference if the inference latency for the layers up to the determined split point satisfies the latency of the device received from the base station. For example, the device may transmit, to the base station, a service performance impossibility message when the latency for the layers up to the determined split point exceeds the latency of the device received from the base station.

In step S2409, the device may transmit, to the base station, split inference result information. The inference result information may include at least one of intermediate data, which is a result value obtained by the device performing inference on the layers up to the split point, or data on the adjusted split point location. For example, the device may transmit, to the base station, intermediate data after performing the split inference. At this time, the device may also transmit, to the base station, data on the adjusted split point location. For example, the base station may perform split inference after the split point based on the received inference result information, and then transmit, to the device, the split inference result information of the base station. For example, if the split point is adjusted up to the output layer, since the device performs all inference, only when the base station requests label data which is the inference result of the AI/ML model, the device may transmit the label data, separately from transmitting data on the split point location.

Examples of the above-described proposed methods may be included as one of the implementation methods of the present disclosure and thus may be regarded as kinds of proposed methods. In addition, the above-described proposed methods may be independently implemented or some of the proposed methods may be combined (or merged). The rule may be defined such that the base station informs the UE of information on whether to apply the proposed methods (or information on the rules of the proposed methods) through a predefined signal (e.g., a physical layer signal or a higher layer signal).

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

The invention claimed is:

1. A method of operating a first device in a wireless communication system, the method comprising:

requesting a second device for channel quality information;

receiving, from the second device, information related to the channel quality information;

performing first split inference based on a first split point determined based on the information related to the channel quality information; and transmitting, to the second device, signals determined based on the information related to the channel quality information, wherein the signals include first split inference result information.

2. The method of claim 1, wherein the first split point is determined by further considering computing power of the first device together with the channel quality information.

3. The method of claim 2, wherein the first split point indicates a point where the first device performs the first split inference on data based on an artificial intelligence learning model.

4. The method of claim 3, wherein the performing the first split inference comprises performing the first split inference up to the determined first split point depending on whether inference latency is satisfied.

5. The method of claim 3, wherein the first split point is determined by further considering a ratio of computing power occupied by a split artificial intelligence/machine learning (AI/ML) model of the first device to total computing power of the first device.

6. The method of claim 5, wherein the first split point is determined to be one of movement from a previously set split point in a direction of an input direction, movement in a direction of an output layer or maintaining based on the channel quality information and information on the ratio of computing power occupied by the split AI/ML model of the first device to total computing power of the first device, and wherein the previously set split point is any one of an initial split point set by the second device based on quality of service (QOS) or a split point adjusted by the first device at the initial split point.

7. The method of claim 4, wherein performing the first split inference comprises performing the first split inference based on the inference latency for layers up to the determined first split point satisfying latency of the first device received from the second device, and transmitting a service performance impossibility indicator to the second device based on the inference latency for layers up to the determined first split point not satisfying the latency of the first device received from the second device.

8. The method of claim 7, wherein, based on the base service performance impossibility indicator being received by the second device, the second device resets at least one of the first split point, a layer-set or an upperbound of the latency of the first device so that the base second device is able to provide a service according to quality of service (QOS) set by a core network.

9. The method of claim 3, wherein the first split inference result information comprises at least one of intermediate data generated as the split inference result or the determined first split point data.

10. The method of claim 3, wherein the first split inference result information is transmitted to the second device only based on the request made by the second device in case that the first split point is adjusted up to an output layer.

11. The method of claim 6, wherein the first split point is determined to be a location after a hidden layer immediately after the input layer based on being moved in a direction of an input layer.

12. The method of claim 3, wherein the second device transmits inference result information of an entire AL/ML model to the core network using the first split inference result information through the remaining split AI/ML model, and the core network transmits the received result information of the entire AI/ML model to a data network (DN).

13. The method of claim 3, wherein the second device performs second split inference from a layer after the determined first split point to an output layer of an AI/ML model, and sets an additional split point between the second device and the core network based on a packet delay budget (PDB) not satisfying from transmission of the result information of the performed second split inference to the core network.

14. The method of claim 1, wherein the first device comprises a terminal, and wherein the second device comprises a base station.

15. A first device in a wireless communication system, the first device comprises:

a transceiver; and a processor connected to the transceiver, wherein the processor is configured to:

request a second device for channel quality information;

receive, from the second device, information related to the channel quality information;

perform split inference based on the determined split point determined based on the information related to the channel quality information; and transmit, to the second device, signals determined based on the channel quality information.

16. The first device of claim 15, wherein the first split point is determined by further considering computing power of the first device together with the channel quality information.

17. The first device of claim 16, wherein the first split point indicates a point where the first device performs the first split inference on data based on an artificial intelligence learning model.

18. The first device of claim 17, wherein the performing the first split inference comprises performing the first split inference up to the determined first split point depending on whether inference latency is satisfied.

19. A second device in a wireless communication system, the second device comprises:

a transceiver; and a processor connected to the transceiver, wherein the processor is configured to:

receive, from a first device, a request for channel quality information;

transmit, to the first device, information related to the channel quality information;

receive first signals of the first device, that is performed up to a split point determined based on the channel quality information;

generate second signals; and transmit, to at least one of the first device or a core network, the second signals.

20. The second device of claim 19, wherein the second signals are inference result information of an entire AI/ML model through the remaining split artificial intelligence/machine learning (AI/ML) model by performing split inference based on the first split inference result information.

\* \* \* \* \*